(12) United States Patent
Currid

(10) Patent No.: US 11,608,654 B2
(45) Date of Patent: *Mar. 21, 2023

(54) HARD SHELL ROOFTOP TENT WITH UTILITY RAILS

(71) Applicant: Thule Sweden AB, Hillerstorp (SE)

(72) Inventor: Evan Michael Currid, Santa Cruz, CA (US)

(73) Assignee: Thule Sweden AB, HIllerstorp (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,068

(22) Filed: May 25, 2022

(65) Prior Publication Data
US 2022/0282515 A1    Sep. 8, 2022

Related U.S. Application Data

(63) Continuation of application No. 17/201,757, filed on Mar. 15, 2021, which is a continuation of application
(Continued)

(51) Int. Cl.
*E04H 15/06* (2006.01)
*B60P 3/34* (2006.01)
(Continued)

(52) U.S. Cl.
CPC ............. *E04H 15/06* (2013.01); *B60P 3/343* (2013.01); *B60P 3/38* (2013.01); *B60R 9/045* (2013.01);
(Continued)

(58) Field of Classification Search
CPC ....... A04H 15/05; A04H 15/644; A04H 15/06
(Continued)

(56) References Cited

U.S. PATENT DOCUMENTS 2,530,450 A    11/1950    Cast
2,811,725 A    11/1957    Cence
(Continued)

FOREIGN PATENT DOCUMENTS

DE    1780662 A1    10/1973
FR    2158927 A7    6/1973
WO    2005005754 A1    1/2005

OTHER PUBLICATIONS

AutoHome Columbus—the rooftop car tent for any vehicle, download from http://www.autohomeus.com/roof-top-tents/columbus-tent/ on Apr. 11, 2016 (2 pages).
(Continued)

*Primary Examiner* — Noah Chandler Hawk
(74) *Attorney, Agent, or Firm* — Sterne, Kessler, Goldstein & Fox P.L.L.C.

(57) ABSTRACT

A tent system includes a base system, a canopy, and one or more interconnecting members. The base system includes a first base member configured to mount to a vehicle, a second base member, and a hinge pivotally attaching the first base member to the second base member. The canopy includes a flexible membrane having a membrane edge and a canopy fastener coupled to at least a portion of the membrane edge and configured to mate with an interconnecting member fastener. The one or more interconnecting members include an interconnecting member body defining a first longitudinal edge and a second longitudinal edge, an attachment member, and the interconnecting member fastener attached to the interconnecting member body along the second longitudinal edge and configured to mate with a plurality of different canopy fasteners.

3 Claims, 23 Drawing Sheets

Related U.S. Application Data

No. 16/671,659, filed on Nov. 1, 2019, now Pat. No. 10,947,753, which is a continuation of application No. 16/107,225, filed on Aug. 21, 2018, now Pat. No. 10,465,412, which is a continuation of application No. 15/625,659, filed on Jun. 16, 2017, now Pat. No. 10,077,574, which is a continuation-in-part of application No. 15/254,961, filed on Sep. 1, 2016, now Pat. No. 9,995,055.

(60) Provisional application No. 62/351,175, filed on Jun. 16, 2016, provisional application No. 62/213,600, filed on Sep. 2, 2015.

(51) Int. Cl.
| | |
|---|---|
| *B60R 9/045* | (2006.01) |
| *B60P 3/38* | (2006.01) |
| *E04H 15/00* | (2006.01) |
| *E04H 15/48* | (2006.01) |
| *B60R 9/10* | (2006.01) |
| *B60R 9/058* | (2006.01) |

(52) U.S. Cl.
CPC .......... *E04H 15/008* (2013.01); *E04H 15/48* (2013.01); *B60R 9/058* (2013.01); *B60R 9/10* (2013.01)

(58) Field of Classification Search
USPC .................. 135/119, 88.13, 88.16; 296/160
See application file for complete search history.

(56) References Cited

U.S. PATENT DOCUMENTS

| | | | |
|---|---|---|---|
| 2,937,651 A | 5/1960 | Van | |
| 3,375,836 A | 4/1968 | Domeneghetti | |
| 3,499,175 A | 3/1970 | Orberg | |
| 3,924,365 A | 12/1975 | Orberg | |
| 3,957,068 A | 5/1976 | Cox | |
| 3,968,809 A | 7/1976 | Beavers | |
| D244,182 S | 5/1977 | Skidmore et al. | |
| D246,365 S | 11/1977 | Floyd | |
| 4,058,133 A | 11/1977 | Barr et al. | |
| D250,013 S | 10/1978 | Siciliano | |
| D255,027 S | 5/1980 | Hemminger | |
| 4,271,856 A | 6/1981 | Ferguson | |
| 4,366,979 A | 1/1983 | Pillot | |
| D273,001 S | 3/1984 | Fink | |
| 4,522,441 A | 6/1985 | Allison | |
| 4,548,438 A | 10/1985 | Myers | |
| D299,223 S | 1/1989 | Galvin | |
| 4,843,647 A * | 7/1989 | Phillips, Sr. ........... | A41D 15/04 2/93 |
| D310,806 S | 9/1990 | Hertzberg et al. | |
| D318,446 S | 7/1991 | Magyar et al. | |
| D318,971 S | 8/1991 | Mitchell | |
| D327,463 S | 6/1992 | Williams | |
| D330,182 S | 10/1992 | Jones | |
| D332,934 S | 2/1993 | Brown et al. | |
| D333,646 S | 3/1993 | Levy | |
| 5,190,066 A | 3/1993 | Joergensen | |
| 5,203,603 A | 4/1993 | Hertzberg | |
| 5,226,261 A | 7/1993 | Wilbourn et al. | |
| D340,689 S | 10/1993 | Wolcott et al. | |
| D342,707 S | 12/1993 | Fields | |
| D352,328 S | 11/1994 | Boyd | |
| D352,690 S | 11/1994 | Schorr | |
| 5,544,671 A | 8/1996 | Philips | |
| D382,248 S | 8/1997 | Long | |
| 5,758,679 A * | 6/1998 | Tamburelli ............. | E04H 15/06 135/88.16 |
| 5,806,906 A | 9/1998 | Hammond | |
| D413,096 S | 8/1999 | Russke et al. | |
| D421,956 S | 3/2000 | Aubut | |
| 6,035,875 A | 3/2000 | Chen | |
| D428,382 S | 7/2000 | Hall | |
| D428,595 S | 7/2000 | Salinas | |
| D431,225 S | 9/2000 | Perlman et al. | |
| 6,145,525 A | 11/2000 | Mooney | |
| D444,445 S | 7/2001 | Schroeder | |
| D445,397 S | 7/2001 | Gaytan | |
| 6,260,306 B1 | 7/2001 | Swetish et al. | |
| 6,263,617 B1 | 7/2001 | Turcot et al. | |
| D454,328 S | 3/2002 | Cornelius | |
| D461,759 S | 8/2002 | Napieraj | |
| 6,722,084 B2 | 4/2004 | Berman | |
| D503,143 S | 3/2005 | Napieraj | |
| D516,497 S | 3/2006 | Napieraj et al. | |
| D521,414 S | 5/2006 | Waters | |
| 7,100,625 B2 | 9/2006 | Valles | |
| D544,402 S | 6/2007 | Westman et al. | |
| D574,315 S | 8/2008 | Swails et al. | |
| D610,067 S | 2/2010 | Frankham | |
| D619,077 S | 7/2010 | Frankham | |
| D619,078 S | 7/2010 | Frankham | |
| D620,995 S | 8/2010 | Hamad | |
| D628,126 S | 11/2010 | Tai | |
| D662,444 S | 6/2012 | Smoak et al. | |
| 8,245,464 B2 | 8/2012 | Saiz et al. | |
| 9,222,278 B2 | 12/2015 | Park | |
| D765,013 S | 8/2016 | Hindelang et al. | |
| 2003/0213512 A1 | 11/2003 | Lee | |
| 2008/0190472 A1 | 8/2008 | Turcot | |
| 2008/0313970 A1 | 12/2008 | Turcot | |
| 2016/0138293 A1 | 5/2016 | Zhou | |

OTHER PUBLICATIONS

Ebay Indigo Campers Roof Top Tent Review, download from https://outbackjoe.com/macho-divertissement/macho-articles/ebay-roof-top-tent-review/ on Apr. 11, 2016 (24 pages).

Product Spotlight: The new ARB Simpson III Roof Top Tent, download from http://forum.ih8mud.com/threads/product-spotlight-the-new-arb-simpson-iii-roof-top-tent.306676/ on Apr. 11, 2016 (12 pages).

* cited by examiner

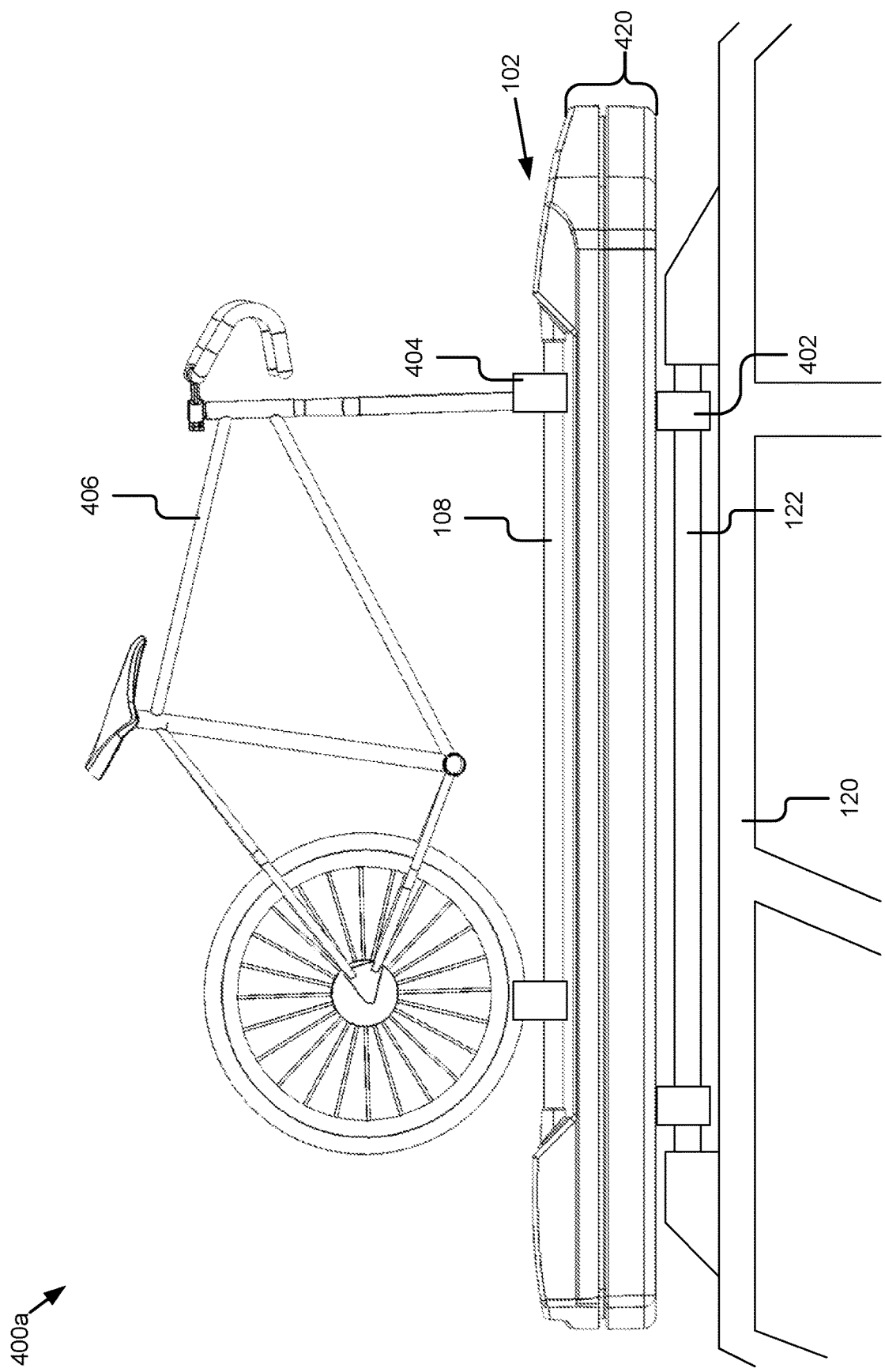

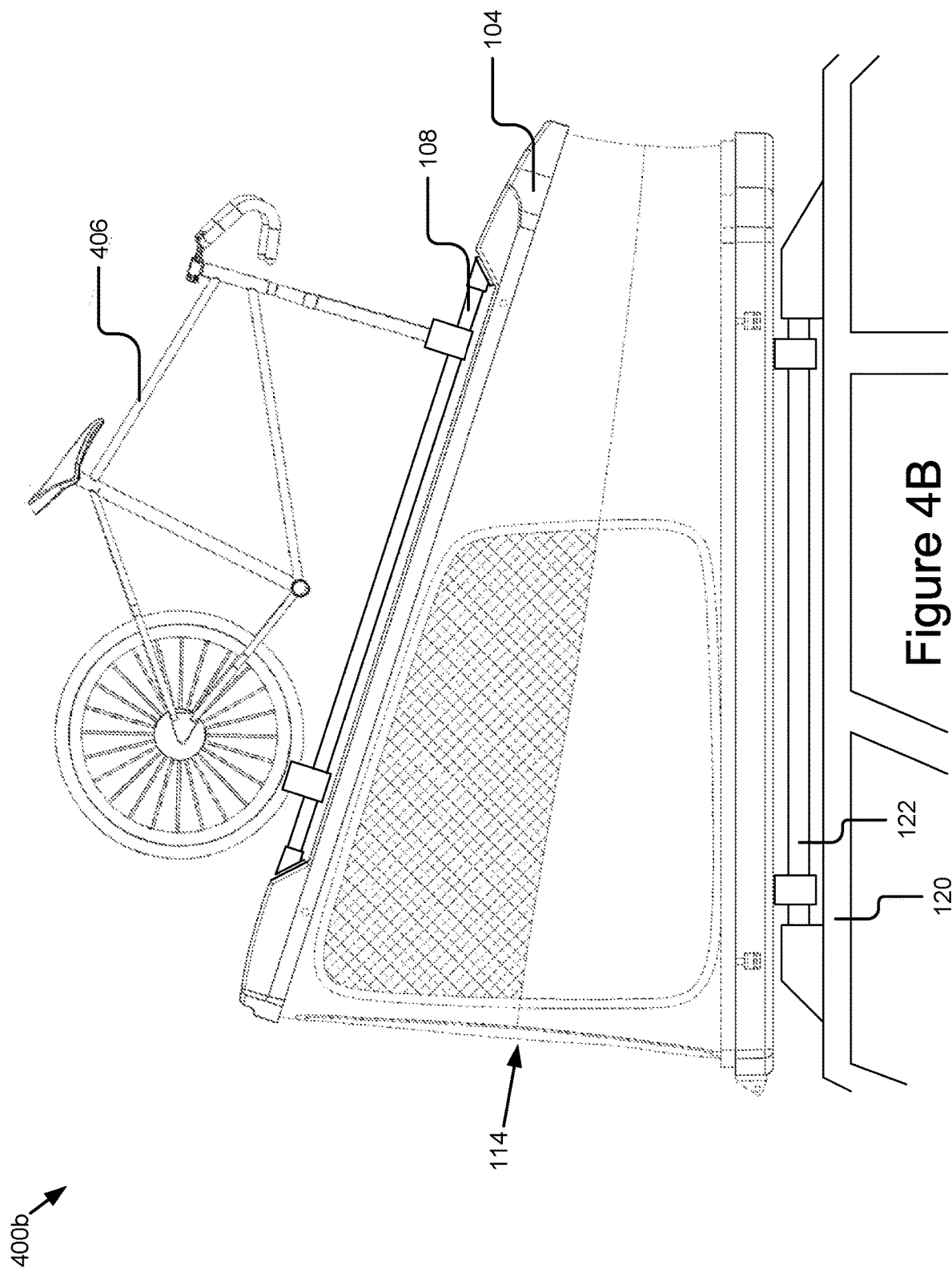

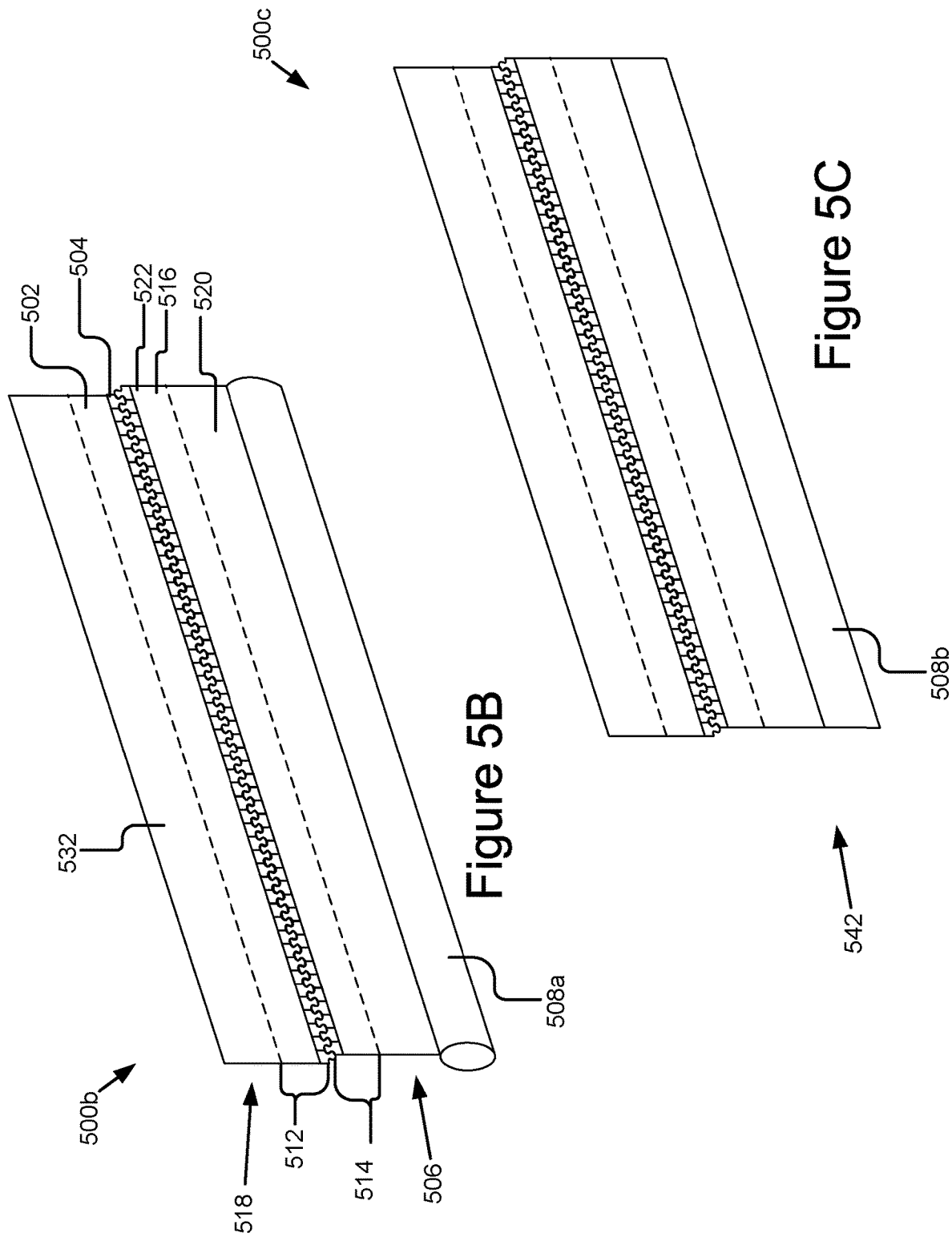

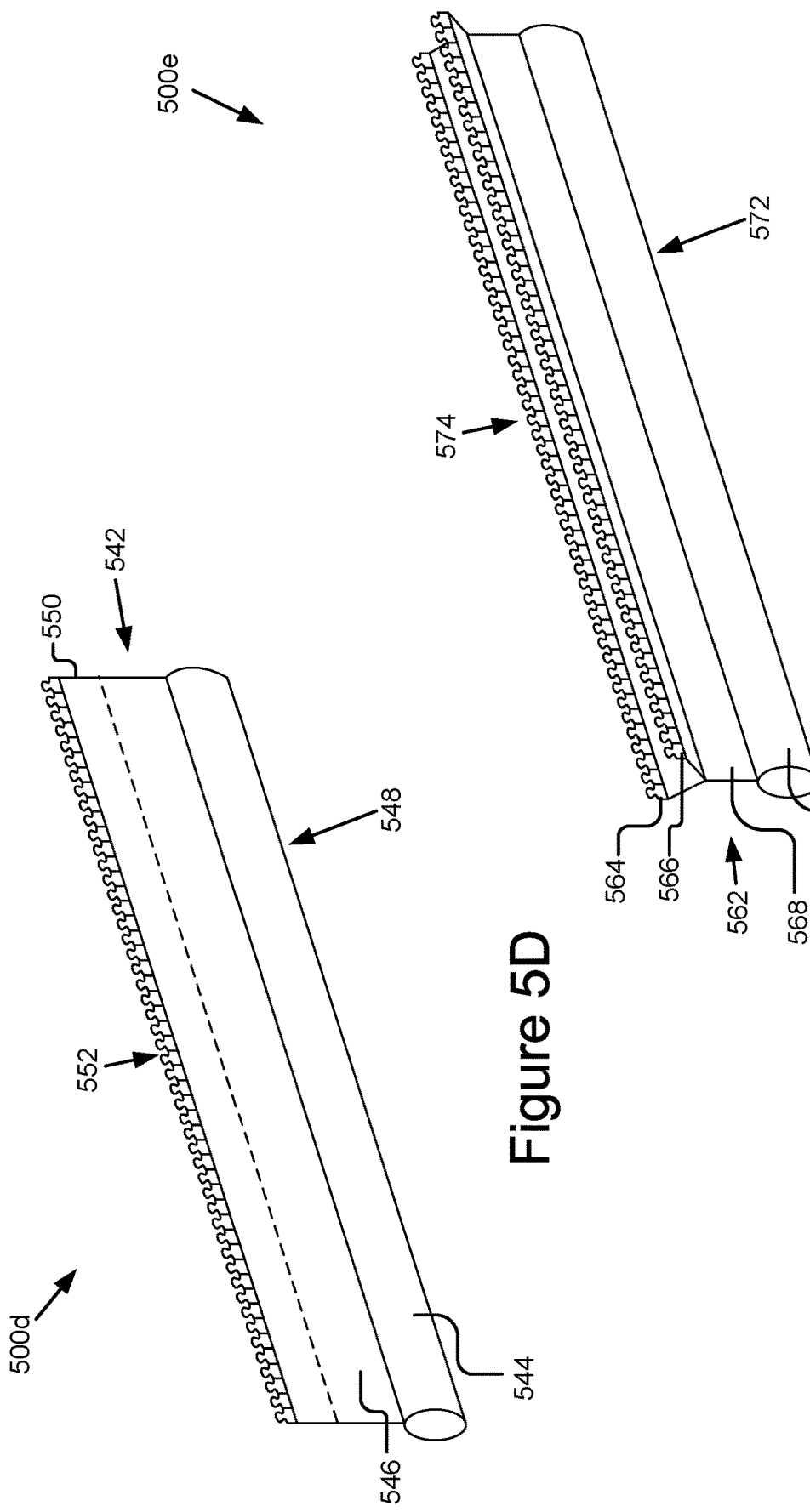

HARD SHELL ROOFTOP TENT WITH UTILITY RAILS

CROSS-REFERENCE TO RELATED APPLICATIONS

This application is a continuation of U.S. application Ser. No. 17/201,757, filed Mar. 15, 2021, which is a continuation of U.S. application Ser. No. 16/671,659, filed Nov. 1, 2019, which is a continuation of U.S. application Ser. No. 16/107,225, filed Aug. 21, 2018, which is a continuation of U.S. application Ser. No. 15/625,659, entitled "Hard Shell Rooftop Tent with Utility Rails," filed on Jun. 16, 2017, which is a continuation-in-part of U.S. application Ser. No. 15/254,961, entitled "Adaptable Tent System with Interconnecting Member," filed on Sep. 1, 2016, which claims the benefit of U.S. Provisional Application No. 62/213,600, entitled "Gimp with Zipper for interchanging a tent base platform with the tent canopy. The Gimp is constructed of the same or similar material to the tent and attached to the base. The Gimp has a zipper on the non-base side. The Gimp allows a person to remove the tent canopy from the tent base simply by unzipping along the perimeter. The Gimp can also be used for an annex attached underneath the vehicle tent's base for easy removal. The use of a gimp is in lieu of attaching the tent or annex to base," filed on Sep. 2, 2015. This application also claims the benefit under 35 U.S.C. § 119(e) of U.S. Provisional Application No. 62/351,175, entitled "Hard Shell Roof-Top Tent with Utility Rails," filed on Jun. 16, 2016, the entire contents of each of which are incorporated herein by reference.

BACKGROUND

The present disclosure relates to rooftop tents that are mountable on a vehicle.

Many outdoors enthusiasts enjoy camping, but setting up a tent can be time consuming and inconvenient, especially when there are no suitable places to put a tent. Additionally, it is frequently beneficial to be located off the ground to avoid disturbing or being disturbed by wildlife. A popular solution to such a problem is a rooftop tent that attaches to the top of a vehicle. Unfortunately, current rooftop tents also present various shortcomings. Many existing rooftop racks are not aerodynamic, thereby causing wind resistance and decreasing fuel efficiency. Additionally, existing rooftop tents are frequently attached to a vehicle's roof rails, which prevents other items, such as bicycles, surfboards, and skis from being mounted to the roof rails.

Existing rooftop tents may include a base that can be mounted to a vehicle and a tent fabric permanently affixed to the base. Such existing rooftop tents tend to be difficult to repair and are unable to adapt to various weather conditions or user needs, in part because the tent fabric is difficult to replace.

Accordingly, there is a need among such tents to improve aerodynamics, ease of use, and utility.

SUMMARY

A rooftop tent system is described. According to some implementations, the rooftop tent system includes a first shell member including a first rigid portion defining a first perimeter edge, the first shell member adapted to mount to a roof of a vehicle. The first shell member also includes a second shell member including a second rigid portion defining a second perimeter edge, the second perimeter adapted to mate with the first perimeter edge when the tent system is in a closed position, the first shell member and the second shell member defining an interior cavity when the tent system is in the closed position, the second shell member moving away from the first shell member when the tent system is in an open position. The first shell member also includes one or more utility rails secured to the second shell member, the one or more utility rails adapted to support one or more items on top of the second shell member. The first shell member also includes an articulating mechanism coupling the first shell member to the second shell member, the articulating mechanism bearing against the second shell member to transfer a weight of the second shell member and the one or more utility rails to the roof of the vehicle when the tent system is in the open position, the articulating mechanism adapted to collapse to a first position when the tent system is in the closed position and extend to a second position when the tent system is in the open position.

In general, another innovative aspect of the subject matter described in this disclosure may be embodied in methods that include operations for the use and manufacture of the system above.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4A-4C are side views of example rooftop tent systems with an example item mounted on the utility rails.

FIGS. 5A-5E are illustrations of example interconnecting members.

DETAILED DESCRIPTION

Figure 1:
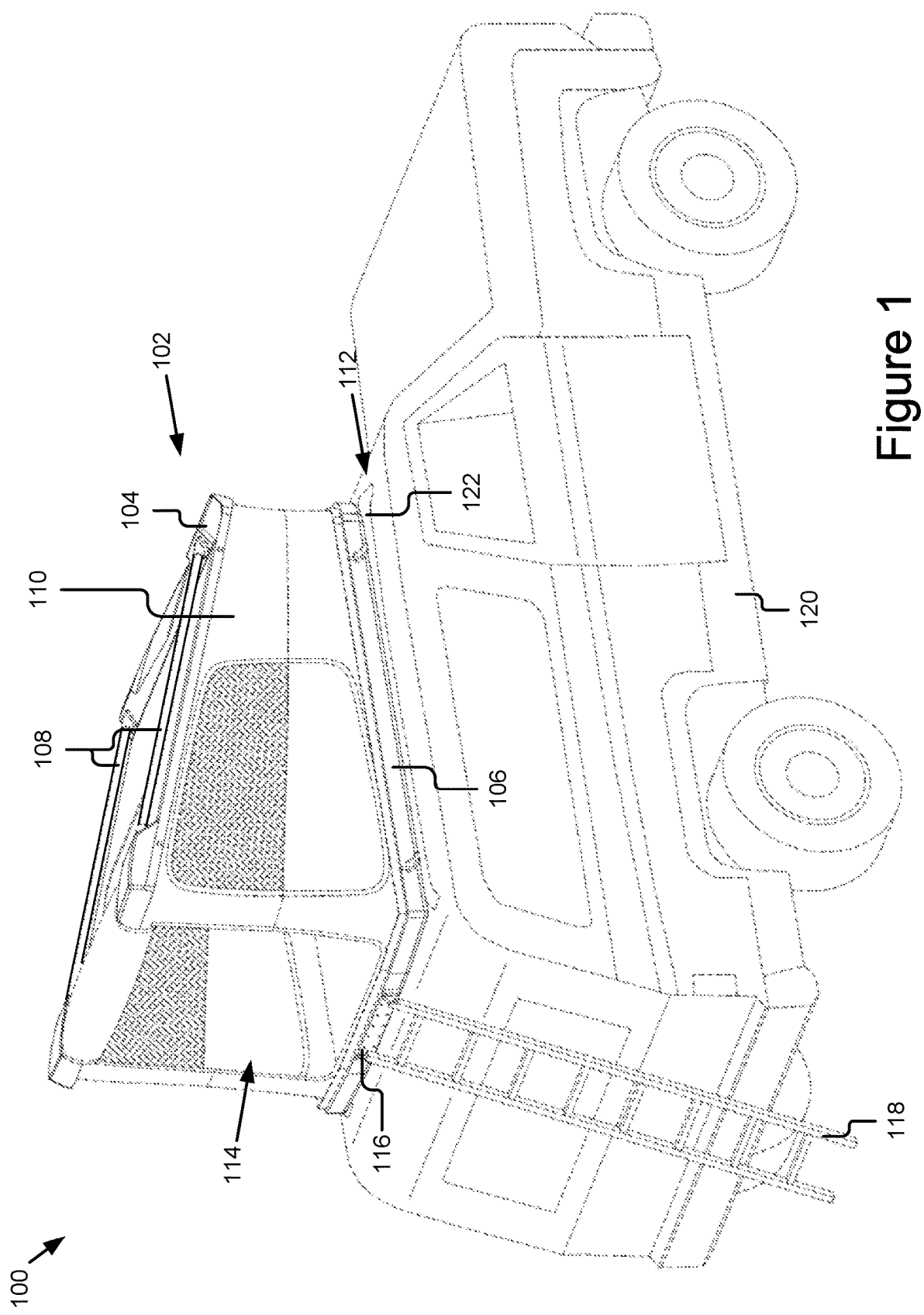
FIG. 1 is a perspective view of an example rooftop tent system in an open position and mounted to a vehicle.

For the purposes of this disclosure, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

The present disclosure describes an innovative technology relating to a rooftop tent system 102 (hereinafter "tent system") for vehicles 120. The tent system 102 may include an aerodynamic hard shell 420 that includes utility rails 108 for mounting items, such as utility roof racks, bicycles, surfboards, skis, kayaks, etc., on top of the tent system 102. It should be further noted that the techniques and systems described herein may be applied to other rooftop systems, such as a vehicle 120 mounted cargo box.

The tent system 102 may include a low profile, rack ready, and versatile hard shell 420. For example, the technologies described herein may allow the tent system 102 to have a low profile (e.g., eight inches thick) while in the closed position, whereas existing soft and hard-shell roof top tents may be substantially thicker (e.g., 50% thicker or 12-13 inches thick) while in a closed position. This low profile, aerodynamic design is made possible, for example, by the shape of the hard shell 420 and the design of its hinges (e.g., the articulating mechanism 202 described herein), among other features.

The tent system 102 may include utility rails 108 that may be integrated with or attached to the top, sides, front, and/or back of the hard shell 420. The articulating mechanism 202 may be configured to include a support or lift assistance mechanism 204 that assists a user to lift or lower the weight of a top half of the hard shell 420, the utility rails 108, and/or items placed on top of the utility rails 108. In some implementations, the lift assistance mechanism 204 may be adjustable or interchangeable so that different weights may be lifted or supported. For example, different interchangeable lift assistance mechanisms 204 with various weight capacities may be used with (e.g., attached to) the hard shell 420 to support a top half of the hard shell 420 as well as bicycles, surfboards, or other items that may be mounted to the utility rails 108.

For example, as discussed in the Background, one of the biggest drawbacks to previous rooftop tents is the fact that people could not bring their gear (e.g., bicycles, skis, or other items) that would typically mount to the roof rails 122 or rooftop rack of their vehicle 120, because the rooftop tents mount to the roof rails 122 or rooftop rack of the vehicle 120 thereby leaving no room for the gear. The technologies described herein may include utility rails 108 mounted on top of the tent system 102 and a lift assistance mechanism 204 that allows a user to open and close the tent system 102 with the gear still supported on the top of the hard shell 420/utility rails 108 rather than have users unload gear attached to the tent system 102 before opening the tent system 102. Accordingly, using the lift assistance mechanism 204 and other components described herein, the tent system 102 may be opened even with potentially heavy items mounted on top of the utility rails 108. For example, lift assistance mechanisms 204 may be removable and interchangeable to support a different amounts of weight. For instance, a user may use one lift assistance mechanism 204 if a surfboard is mounted to the tent system's utility rails 108 and a different (e.g., with a different weight rating) lift assistance mechanism 204 if a bicycle is mounted to the utility rails 108.

In some implementations, the tent system 102 may include a flexible membrane 110 (e.g., tent fabric) and an interconnecting member 506 (e.g., as described in reference to FIGS. 5A-5E) for detachably coupling the tent fabric to one or more of the components of the hard shell 420. For example, the interconnecting member 506 allows a hard shell 420 and tent fabric (e.g., the flexible membrane 110 described herein) to be easily separable so that the tent fabric can be easily replaced, repaired, and/or stored. In some implementations, due to the interchangeable nature of components of the interconnecting member 506, multiple tent fabrics can be interchangeably or simultaneously mounted to the hard shell 420 to provide adaptability to various weather conditions or user needs.

The hard shell 420, utility rails 108, articulating mechanism 202, lift assistance mechanism 204, interconnecting member 506, and other components of the tent system 102 are described in further detail throughout this disclosure.

Figure 2:
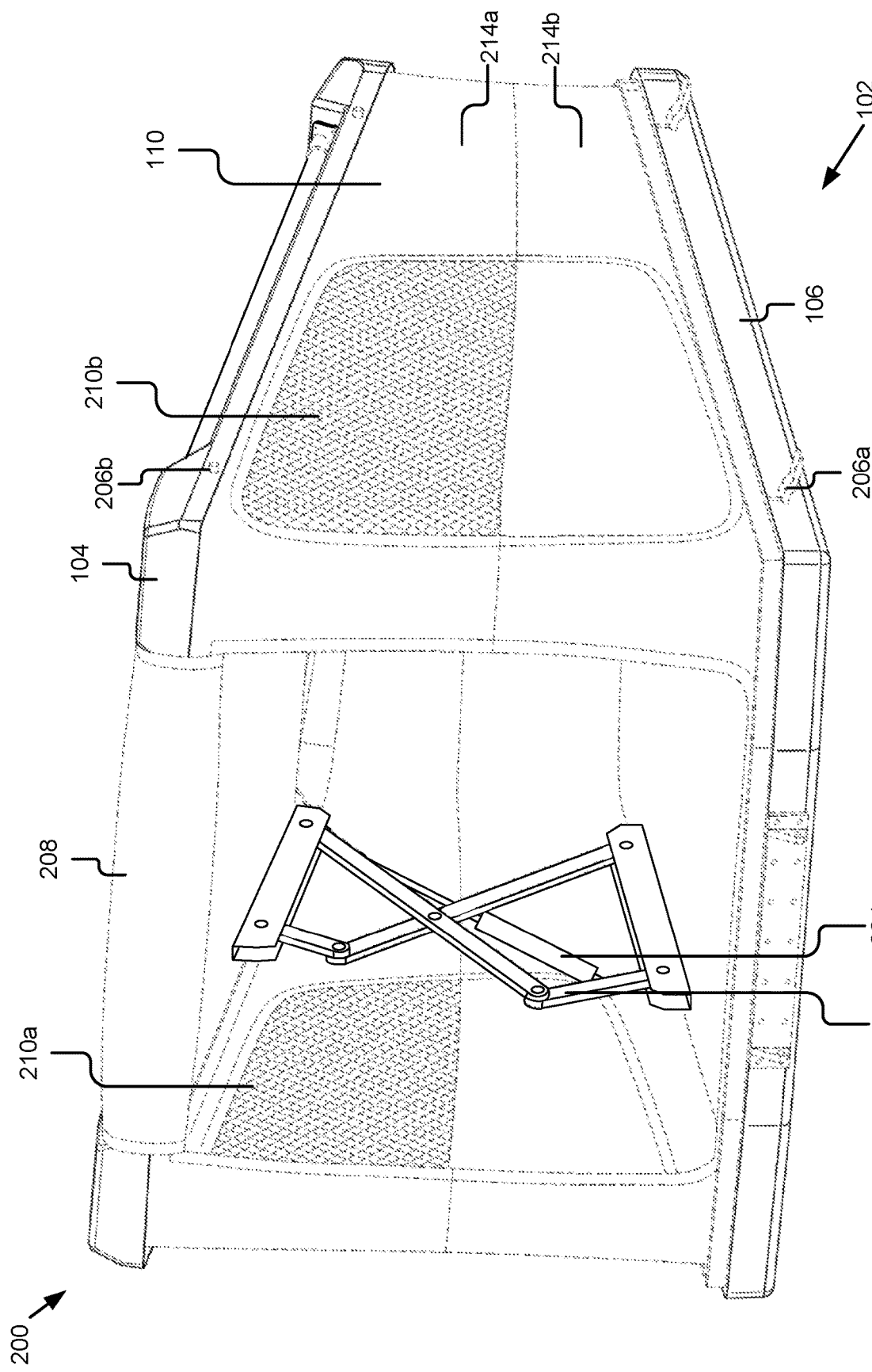
FIG. 2 is a perspective view of an example rooftop tent in an open position.
Figure 6A:
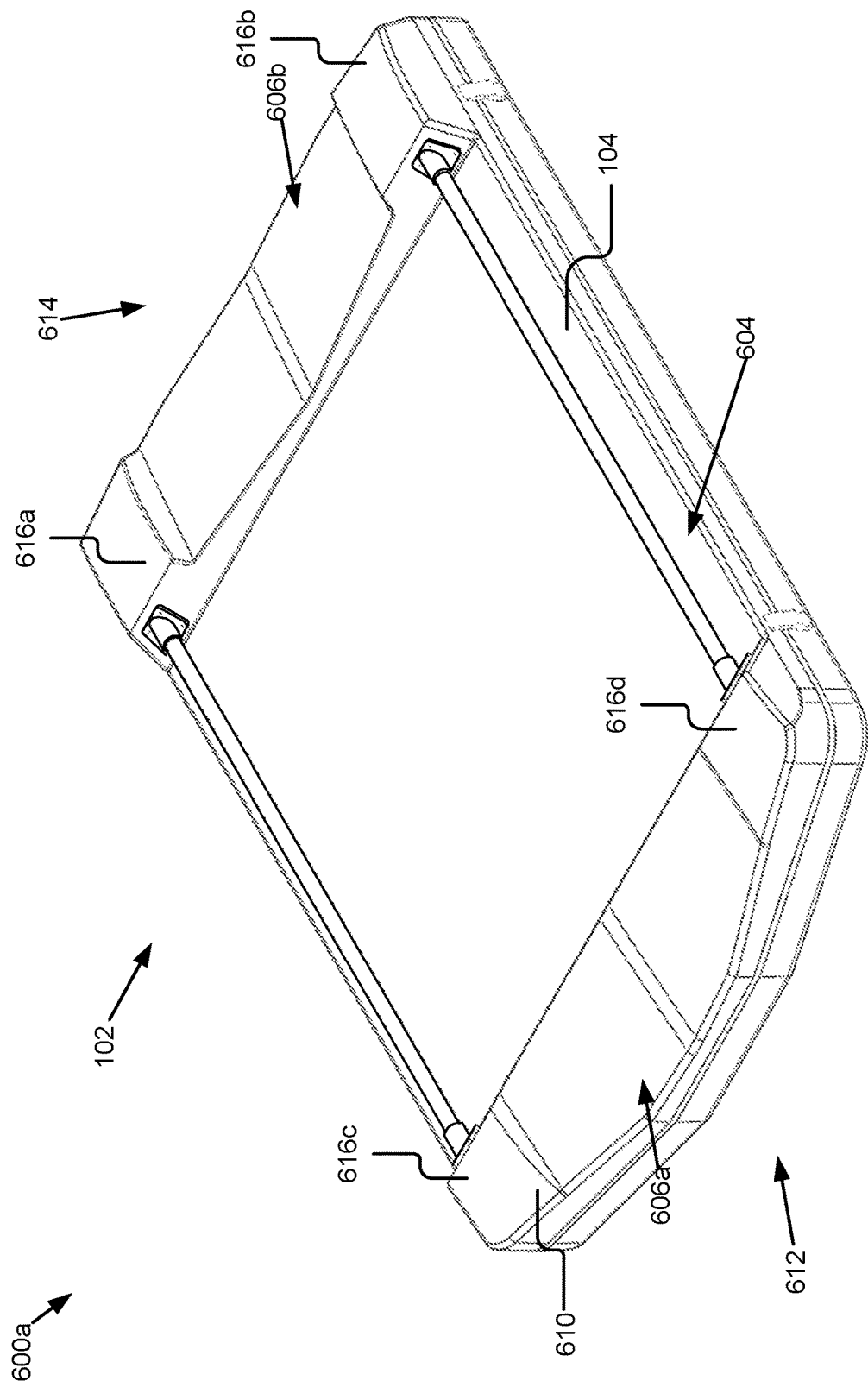
FIGS. 6A-6C are top perspective views of an example rooftop tent system.
Figure 6B:
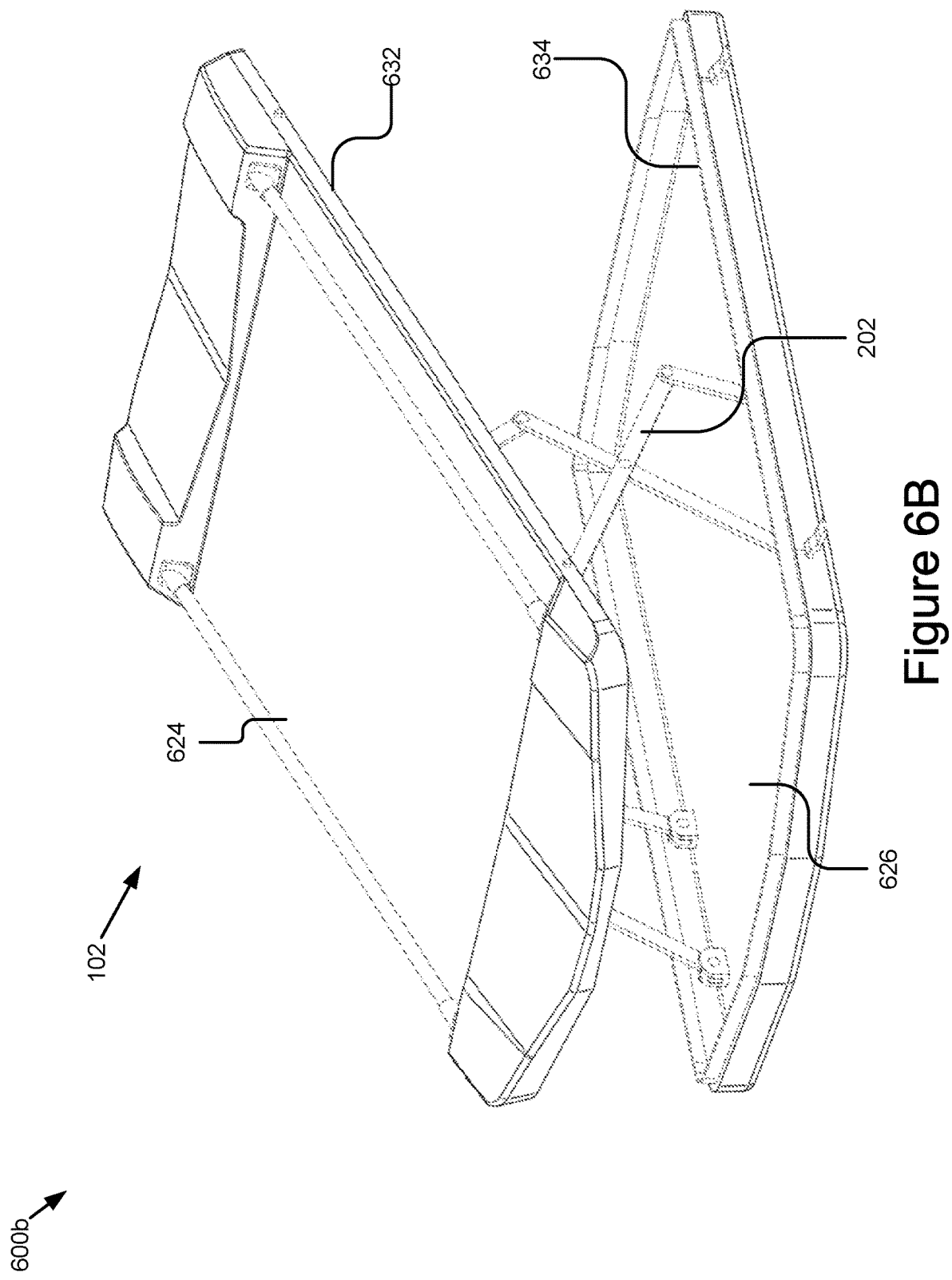

FIG. 1 is a perspective view 100 of an example rooftop tent system 102 in an open position and mounted to a vehicle 120. As illustrated, the tent system 102 may comprise a hard shell 420 with attached utility rails 108. The hard shell 420 may include a bottom shell member 106 adapted to mount to a roof of a vehicle 120 and a top shell member 104 adapted to mate with the bottom shell member 106 when the tent system 102 is in a closed position. The bottom shell member 106 and the top shell member 104 define an interior cavity when the tent system 102 is in the closed position (e.g., as illustrated in FIG. 6A, for example). The top shell member 104 may move away from the bottom shell member 106 when opening the tent system 102 and be held in a given orientation relative to the bottom shell member 106 by the articulating mechanism 202 (e.g., as shown in FIGS. 2 and 6B).

The bottom shell member 106 and/or top shell member 104 of the hard shell 420 may be constructed of substantially rigid material. For example, in some implementations, the hard shell 420 may include fiberglass sandwich construction. Fiberglass sandwich construction allows a high strength to weight ratio, so the tent system 102 may be easily transported and mounted while also being capable of supporting the weight of items attached to its utility rails 108. It should be understood that other materials are possible and contemplated herein, for example, the hard shell 420 may be constructed of other lightweight but strong materials, such as certain types of plastics, carbon fiber, aluminum, steel, etc.

The utility rails 108 may include one or more bars, poles, rails, rods, etc., integrated with or secured to the top shell member 104. For example, the utility rails 108 may include two parallel load bars adapted to receive (e.g., have mounted thereon) a vehicle 120 utility rack or may include an integrated utility rack. In some implementations, the bars may range from plus or minus 6 inches from 36 inches long, although other lengths are possible. In some implementations, the utility rails 108 may replicate vehicle 120 utility rails 108 mounted on or integrated with a vehicle 120. The utility rails 108 may run longitudinally (e.g., with the length of the vehicle 120, as shown in FIG. 1) or transversely (perpendicular to the length of the vehicle 120) on the tent system 102. The utility rails 108 are adapted to support one or more items on top of the top shell member 104, for example, as illustrated and described in reference to FIGS. 4A-4B.

In some implementations, the integrated utility rails 108 may be rack ready (e.g., configured to allow standard, transversely mounted vehicle 120 roof racks to be attached to the utility rails 108). Load bars of the utility rails 108 may be constructed from a different material from the fiberglass shell, such as steel, aluminum, etc. In some implementations, the technologies described herein may allow the utility rails 108 to support a weight in excess of 150 pounds on top of the top hard shell member 104.

As illustrated in FIG. 1, the tent system 102 includes a flexible membrane 110 that extends between the top shell member 104 and the bottom shell member 106 to define an enclosure within the tent system 102 when the tent system 102 is in a deployed or open position. For example, the flexible membrane 110 may form tent sides while the bottom shell member 106 forms a base and the top shell member 104 forms a roof of the tent system 102. The flexible membrane 110 may include any type of expandable, foldable, or flexible material, such as fabric, canvas, mesh, net, vinyl, nylon, polyester, etc.

In some implementations, the flexible membrane 110 may be detachably secured to the bottom 106 and/or top shell members 104 via an interconnecting member 506 (e.g., as described in reference to FIGS. 5A-5E). One of the benefits using the interconnecting member 506 is the ability to use additional, fewer, or different materials to construct the flexible membrane 110 than are used in existing tents. For example, a flexible membrane 110 may be constructed of mesh, and may allow an additional flexible membrane 110 (e.g., constructed of water resistant material) to be attached hard shell 420 in addition to, or in place of, the mesh flexible membrane 110 using the interconnecting member 506.

In some implementations, the tent system 102 may include an attached or attachable ladder 118, which may be deployed over the back or a side of the vehicle 120, depending on the implementation, to enable a person to climb into the tent system 102. In some implementations, the ladder 118 may be attached to the bottom or side of the bottom shell member 106.

In some implementations, the ladder 118 may be coupled to the bottom shell member 106 via a mounting mechanism, such as the ladder bracket 116, a sliding mount, hooks, bolts, adhesive, rivets, or any other suitable mechanism. In some implementations, the ladder 118 may be detachably coupled to the bottom shell member 106 via a ladder bracket 116. In some implementations, the ladder 118 may be slidably coupled to the bottom shell member 106 via a sliding mount (not shown), which enables the ladder 118 to slide into or beneath, for example, the bottom shell member 106. For example, the sliding mount may include a cavity formed by the bottom shell member 106, L channels, C channels (e.g., two channels with openings facing each other), or another mounting mechanism, affixed to or formed by the bottom shell member 106 into which all or a component of the ladder 118 may slide and lock in place when the ladder 118 is not in use. It should be noted that other configurations are possible and contemplated, such as where the ladder 118 is pivotally mounted to tent, for example, so that it may fold on top of, underneath, or to the side/back of the tent system 102 when not in use. Similarly, the ladder 118 (and a doorway 114) to the tent system 102 may be placed at a rear (as shown in FIG. 1), side, or other locations on the tent system 102. In some instances, the ladder 118 may be alternatively attachable to one or both of the back of and a side of the vehicle 120 to allow the tent system 102 to mount to a variety of vehicles 120. Further, the ladder 118 may be telescopic to accommodate for different heights of vehicles 120.

FIG. 2 is a perspective view 200 of an example rooftop tent system 102 in an open position. As shown in FIG. 2, the tent system 102 may have a door 208 (shown in an open position draped over the top shell member 104) and two windows 210a and 210b, although other implementations are possible and contemplated. In some implementations, the door 208 may include a flap constructed of the same material as the flexible membrane 110 on the sides and may be openable/closable via zipper. In some implementations, the windows 210 may be constructed of mesh or clear plastic and may include a water resistant membrane or flap to cover the windows for privacy or weather protection. In some implementations, a top portion 214a of the tent sides may be constructed of a lightweight or breathable material, such as mesh, while a bottom portion 214b of the tent sides may be constructed of a heavier material than the top portion 214a, such as canvas, thereby providing privacy, durability, and breathability.

FIG. 2 also illustrates an example articulating mechanism 202. For example, in the illustrated implementation, the articulating mechanism 202 may include a scissor-type hinge where components may slide along the sides of each other to reduce the size of the articulating mechanism 202 when the tent system 102 is in a closed position and extend to attach the top shell member 104 to the bottom shell member 106 when the tent system 102 is in an open position (e.g., as shown in FIG. 2). As illustrated, the articulating mechanism 202 may include or have attached a lift assistance mechanism 204 configured to assist in lifting the second shell member to an open position. For example, the lift assistance mechanism 204 may include a strut that is adapted to support the weight comprising the top shell member 104, the flexible membrane 110, the utility rails 108, and/or items or gear that may be placed on top of the top shell member 104 or utility rails 108.

In some implementations, the articulating mechanism 202 may couple the bottom shell member 106 to the top shell member 104. The articulating mechanism 202 may bear against the second shell member to transfer a weight of the second shell (and items supported by the top shell member 104 or utility rails 108) to the roof 112 of the vehicle 120 when the tent system 102 is in the open position. The articulating mechanism 202 may be adapted to collapse to a first position when the tent system 102 is in the closed position and extend to a second position when the tent system 102 is in the open position. The articulating mechanism 202 and lift assistance mechanism 204 are shown and described in further detail in reference to FIG. 3A.

In some implementations, the tent system 102 may include one or more latches 206a and latch points 206b for holding the hard shell 420 in a closed position (e.g., as shown, for example, in FIG. 6A). For example, a latch 206a may be attached to the bottom shell member 106 and a latch point 206b may be attached to the top shell member 104, although other implementations are possible. The latch 206a attaches to the latch point 206b to securely hold the hard shell 420 in a closed position, especially when there are items mounted to the utility rails 108. In some implementations, the laches 206 may be constructed of a high quality thermoplastic elastomer, metal, or other material.

Figure 3A:
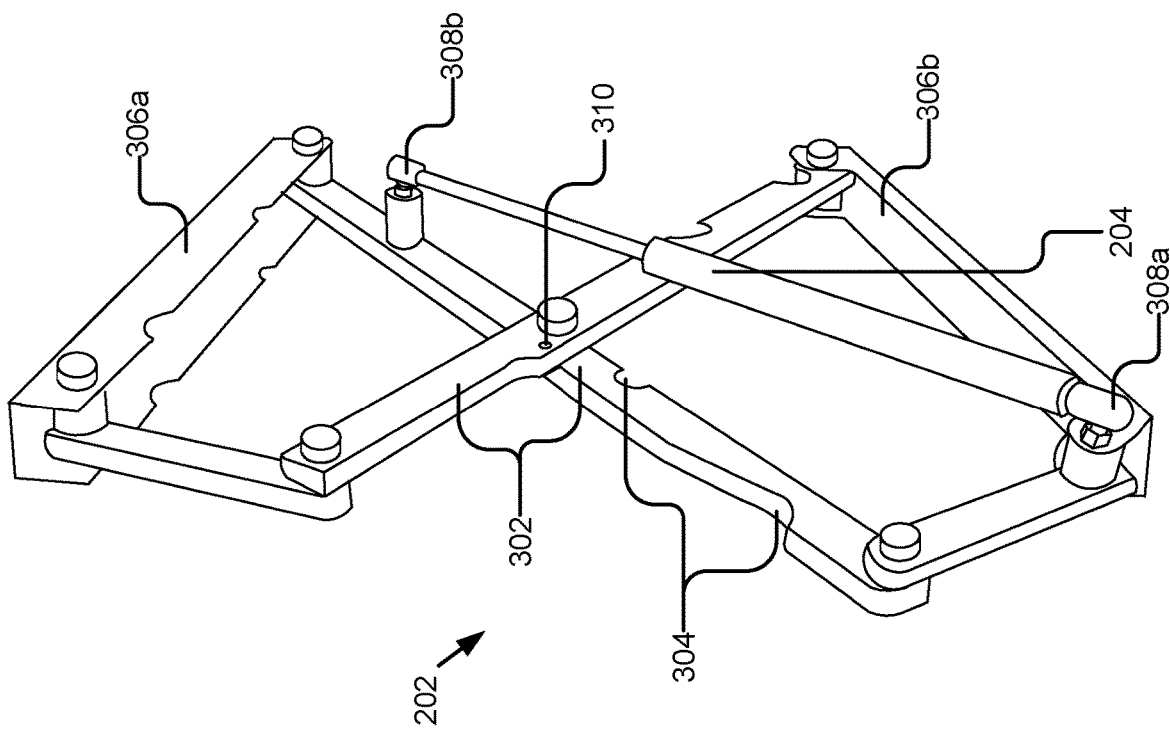
FIGS. 3A and 3B illustrate an example articulating mechanism, lift assistance mechanism, and bracket plate.

FIG. 3A illustrates an example articulating mechanism 202 with an example lift assistance mechanism 204. An articulating mechanism 202 couples the bottom shell member 106 to the top shell member 104 and bears against the top shell member 104 to transfer a weight of the top shell member 104, the utility rails 108, and any items that may be placed thereon to the roof of the vehicle 120 when the tent system 102 is in the open position. The articulating mechanism 202 beneficially allows the tent system 102 to open widely, but close to a low-profile design.

The articulating mechanism 202 may include a scissor-type hinge, a custom designed multi bar hinge linkage, or other configuration. The hinge assembly/linkage may be constructed of steel, aluminum, or other suitably strong materials and may include interchangeable supports, such as a lift assistance mechanism 204. The articulating mechanism 202 may be fixably attached to the bottom shell member 106 and top shell member 104 via one or more mounting brackets 306a and 306b or mounting points. In some implementations, the mounting brackets 306 may be bolted, glued, welded, or otherwise affixed to the bottom shell member 106 or top shell member 104.

Figure 3B:
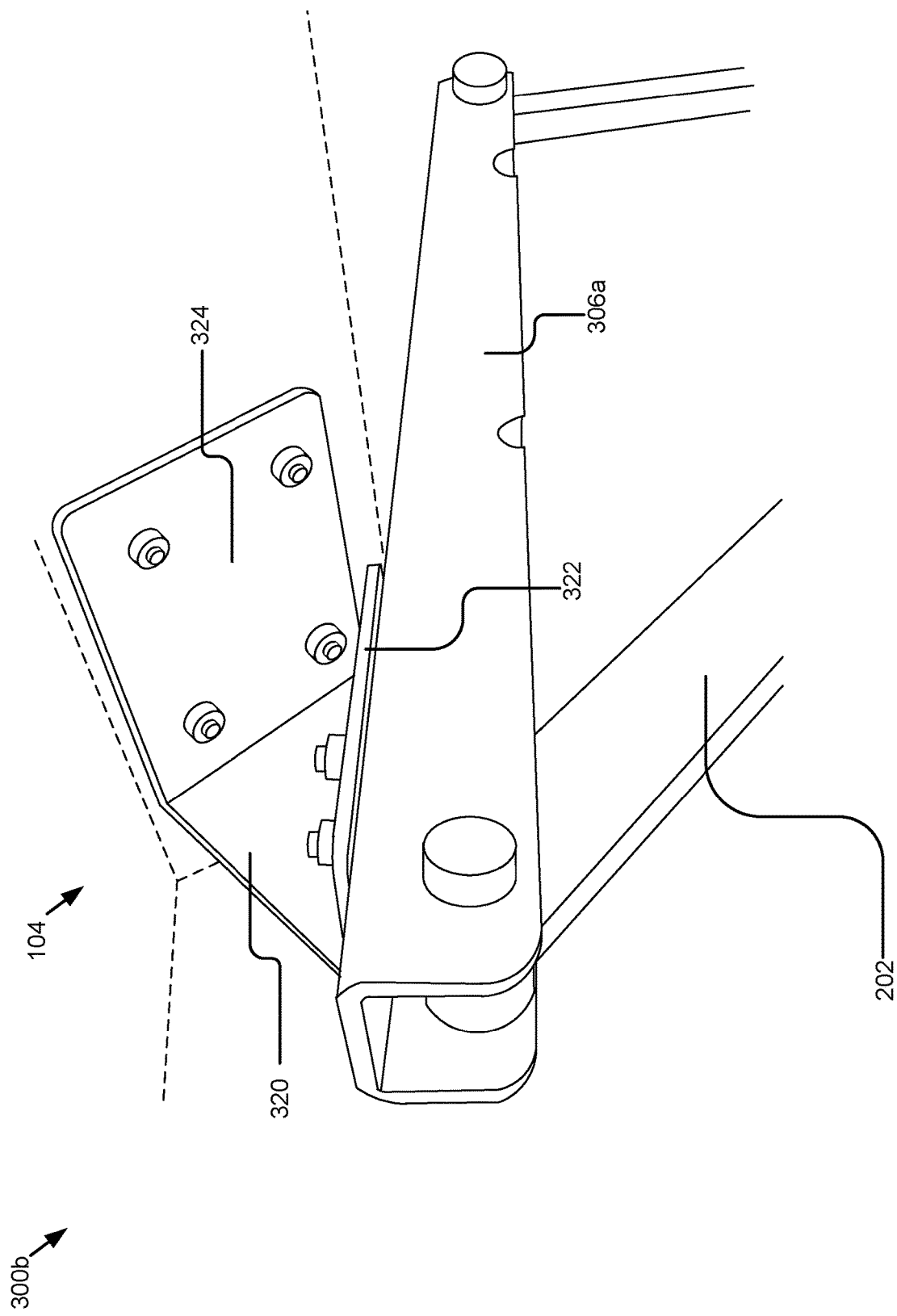

In some implementations, a bottom mounting bracket 306b may be affixed to the bottom shell member 106 and also to mounting hardware (e.g., a bracket or other apparatus affixed to the bottom shell member 106 for mounting the tent system 102 to roof of the vehicle 120). In some implementations, a top mounting bracket 306a may be affixed to the top shell member 104 and to the utility rails 108, for example, via a bracket plate 320, as illustrated in FIG. 3B. These configurations further strengthen the tent system 102 to enable the tent system 102 and articulating mechanism 202 to support the weight of the utility rails 108 and items placed on top of the utility rails 108.

The articulating mechanism 202 is adapted to collapse to a first position when the tent system 102 is in the closed position and extend to a second position when the tent system 102 is in the open position. For example, various bars 302 of the articulating mechanism 202 may be positioned to slide past one or more of the other bars 302 in the articulating mechanism 202. Further, some of the bars may be notched or shaped 304 to fit other bars or pivot points, so that when the articulating mechanism 202 is in a collapsed/closed position, the entire assembly is compact thereby lowering the profile of the tent system 102 and correspondingly decreasing wind resistance and bulk.

In some implementations, the articulating mechanism 202 is adapted to lock in place when the tent system 102 is in an open position. This may be accomplished using various mechanisms, such as a pin system, a rod extending between points on the articulating mechanism 202 or the bottom and top shell members 104, or other structures for holding the articulating mechanism 202 or hard shell 420 open. For example, as illustrated, a central pivot point (or any other pivot point) of the articulating mechanism 202 may have a hole 310 penetrating the bars 302 that cross at the central pivot point. A user may insert a pin through the hole 310 to lock the articulating mechanism 202 in place.

In some implementations, the articulating mechanism 202 may include a lift assistance mechanism 204 adapted to assist in lifting the top shell member 104 (and, potentially, items supported by the top shell member 104) to an open position. It should be noted that although the lift assistance mechanism 204 is illustrated as including a strut, other implementations are possible, such as a spring, gas ram, electric motor, pulley, etc. The lift assistance mechanism 204 may be removable, and/or interchangeable with one or more other supports having different weight ratings/weight lift capacities, or the lift assistance mechanism 204 may be adjustable to support to lift and/or support various weights.

In some implementations, the lift assistance mechanism 204 is detachably connected to the articulating mechanism 202, bottom shell member 106, and/or the top shell member 104 using ball joints 308a and 308b. The ball joints 308 may have a locking mechanism to attach the lift assistance mechanism 204 to the tent system 102 to allow the lift assistance mechanism 204 to be easily mounted and unmounted from the articulating mechanism 202 (or other mount points), although other implementations and connection types are possible.

FIG. 3B illustrates an example mounting bracket 306a of the articulating mechanism 202 and a bracket plate 320 shown as attached at a bottom surface of a top shell member 104. The bracket plate 320 may couple the mounting bracket 306a, (and therefore the articulating mechanism 202, and in some instances, the lift assistance mechanism 204) to the top shell member 104 and, in some implementations, to the utility rails 108. For example, a first element 322 of the bracket plate 320 may attach to the top mounting bracket 306a and a second element 324 of the bracket plate 320 may attach to the utility rails 108 (or a mounting component of the utility rails 108). For example, a front mount point (not shown in FIG. 3B) of a utility rail 108 may attach to the bracket plate 320 through the top shell member 104 using bolts or some other mechanism, thereby providing further strength to the utility rails 108 and the connection between the utility rails 108 and the top shell member 104.

The bracket plate 320 provides a strong coupling between the utility rails 108 and the articulating mechanism 202. Accordingly, the weight of the utility rails 108 and any items or gear placed on the utility rails 108 may be transferred through the articulating mechanism 202 without putting excessive stress on the top shell member 104. This is beneficial, for example, in implementations where the top shell member 104 tips forward when in an open position, as illustrated in FIGS. 1, 4B, and 6B. In such implementations, the weight of items secured to the utility rails 108 may shift toward the front of the tent system 102, putting additional stress on the coupling between the utility rails 108 and the top shell member 104, which stress may be supported by the bracket plate 320.

FIG. 4A is a side view 400a of an example rooftop tent in a closed position with an example item 406 mounted thereon. As shown, the tent system 102 is mounted to the roof of a vehicle 120 using mounting hardware 402 for mounting the tent system 102 to the vehicle's 120 roof rails 122. In some implementations, the mounting hardware 402 may include transverse bars or other another mechanism attached (e.g., bolted, formed within, etc.) to the bottom of the bottom shell member 106. For example, the mounting hardware 402 may include a transversely mounted rail, rack, clamps, straps, or other mounting hardware configured to attach the tent system 102 to vehicle roof rails 122.

As shown in the example implementation, the tent system 102 may include utility rails 108 integrated into the top shell member 104, although it should be noted that the integrated utility rails 108 may be attachable or detachable, etc. The utility rails 108 may support items directly or via an integrated or attachable utility/roof rack 404. The roof rack 404 may be bicycle, ski, or other specialized rack. For example, the roof rack 404 may include transversely mounted rails that may attach items 406 or include attachments configured to attach items 406, such as bicycles, skis, or surfboards. Further, as shown in FIG. 4A, the utility rails 108 have an item 406 mounted using an optional roof rack 404. As illustrated, the item 406 includes a bicycle, but one or more of other or additional items 406 may be mounted, such as bicycles, surfboards, kayaks, cargo boxes, etc.

FIG. 4B is a side view 400b of an example rooftop tent system 102 in an open position with an example item 406 mounted thereon. As illustrated in the side view 400b, the tent system 102 may be deployed in an open position while an item 406 is still attached to the utility rails 108. For example, a lift assistance mechanism 204 (not shown in FIG. 4B) may have a given weight rating adapted to support the top shell member 104, the utility rack 404, and a particular item 406, such as the illustrated bicycle, to help a user open the hard shell 420 while the item 406 remains mounted to the utility rails 108.

Figure 4C:
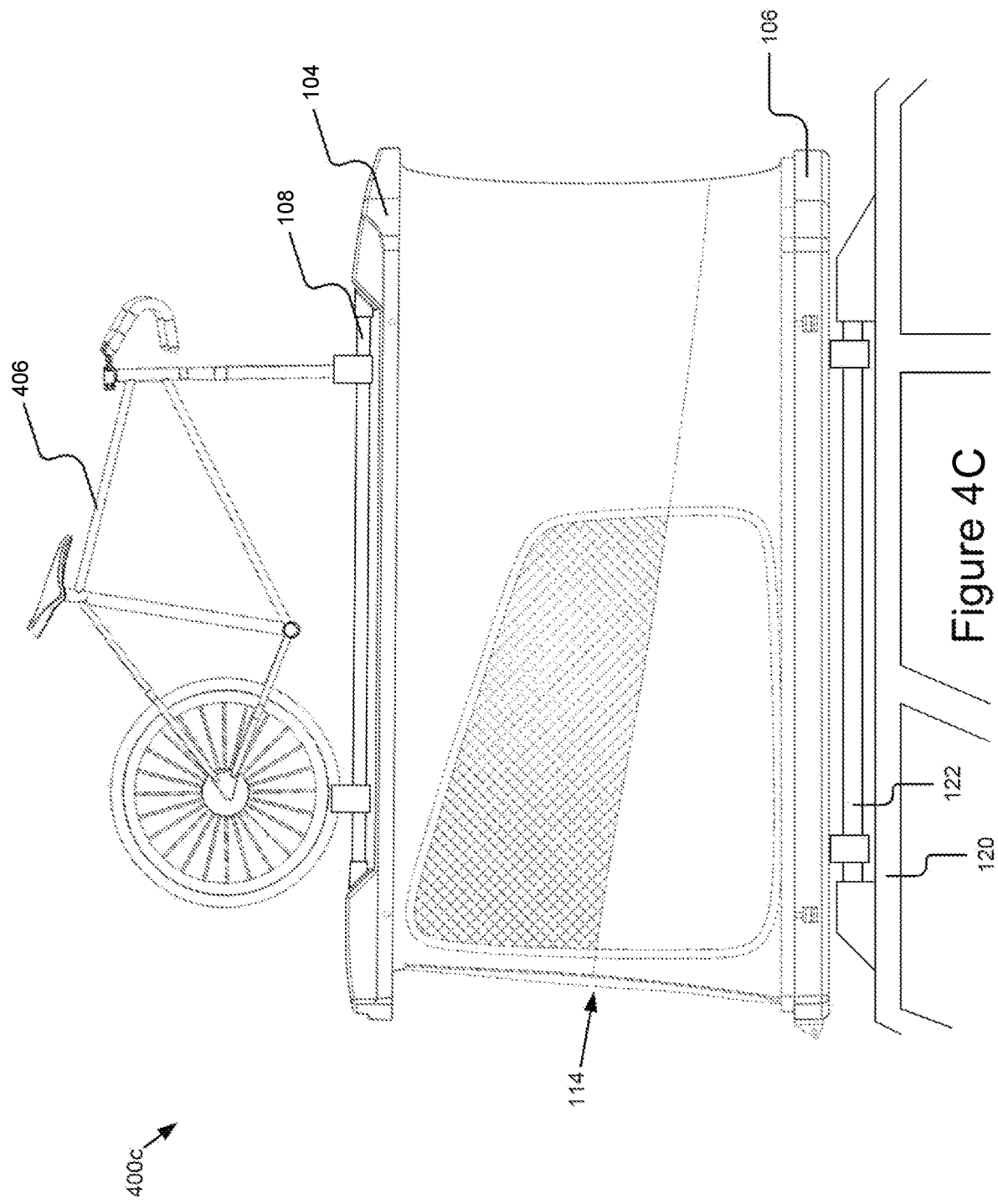

In some implementations, the articulating mechanism 202 (and, for instance, the flexible membrane 110, the lift assistance mechanism 204, or other components of the tent system 102) may be configured so that the top shell member 104 tips forward (or another direction) away from a doorway 114, as illustrated in FIG. 4B. The feature where the top shell member 104 tips forward (e.g., is not parallel with the bottom shell member 106) provides additional headroom near the doorway 114 and ladder 118 for ease of ingress/egress. In implementations where the top shell member 104 tips forward, as shown in FIG. 6B, the articulating mechanism 202 may be positioned forward on hard shell 420 or otherwise configured to support the weight of the top shell member 104 and/or any items mounted thereon when the tent system 102 is in an open position (e.g., so the top shell member 104 is tipped forward). It should be noted that the top shell member 104 may alternatively remain parallel with the bottom shell member 106, for example, as illustrated in FIG. 4C.

Figure 5A:
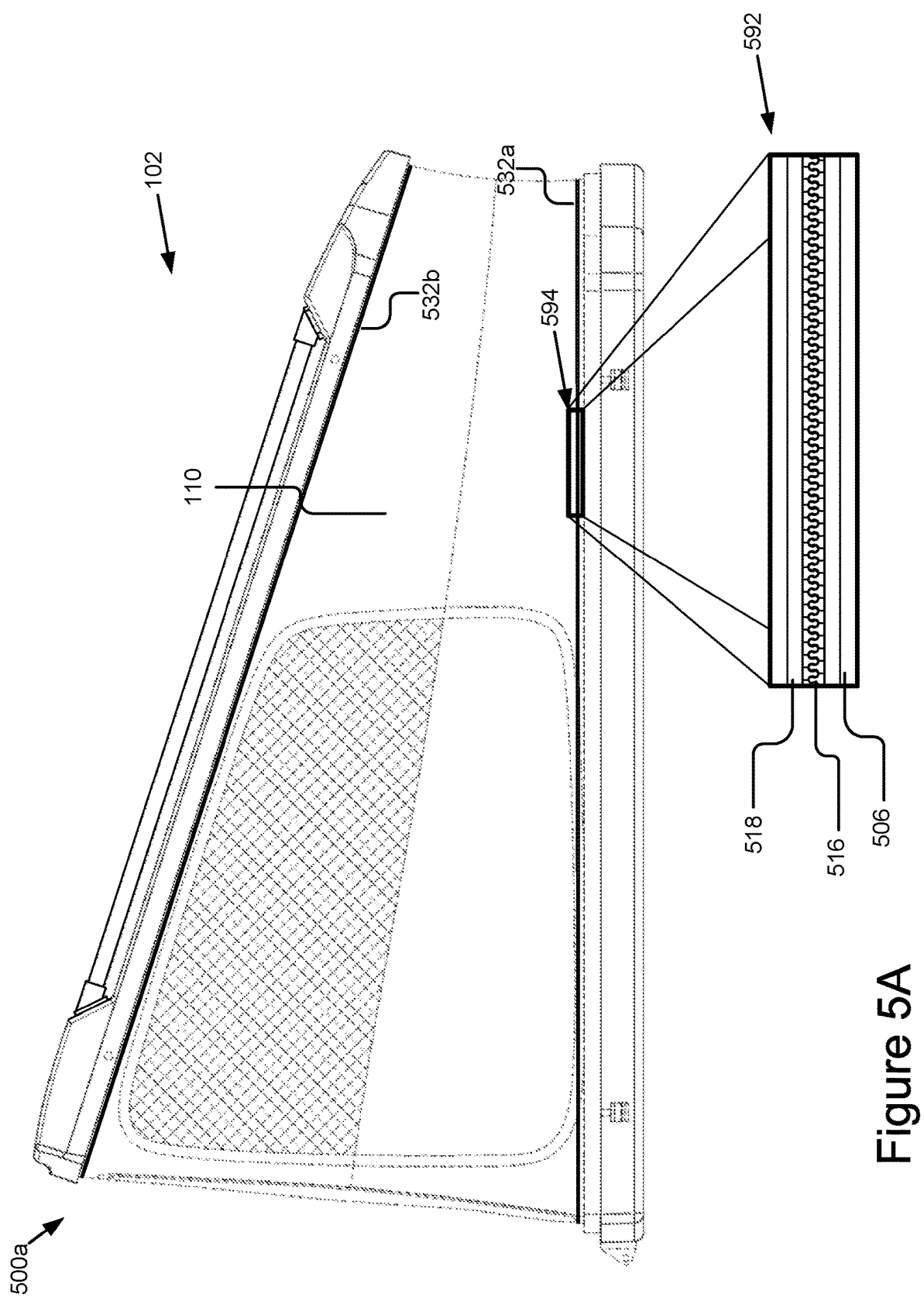

FIG. 5A is a side view 500a of the tent system 102 in an open position with a magnified view 592 of a portion 594 of the tent system 102. As illustrated, the flexible membrane 110 includes a first flexible membrane fastener 518 extending along and fixably attached to a first membrane edge 532a and/or a second flexible membrane fastener 518 (the second flexible membrane fastener 518 may be configured in the same way as the first flexible membrane fastener 518, so the description of the membrane fasteners are combined) extending along and fixably attached to the second membrane edge 532b. The flexible membrane fastener 518 may detachably affix to an interconnecting member fastener 516 of an interconnecting member 506. The interconnecting member 506 may, in turn, be attached to an edge of a bottom shell member 106 or top shell member 104 (e.g., a first interconnecting member 506 may be attached to a bottom shell member 106 and a second interconnecting member 506 may be attached to a top shell member 104). The detachable coupling between the flexible membrane fasteners 518 and the interconnecting member fasteners 516 (and thereby the hard shell 420) enables the flexible membrane 110 to be easily exchanged with other flexible membranes 110 for repair, adaptation to varying weather, etc.

In some implementations, the interconnecting member fastener 516 and flexible membrane fastener 518 may each include a half of a zipper; however, it should be noted that other implementations for fastening the flexible membrane 110 to the interconnecting member 506 are possible and contemplated herein. The interconnecting member 506 and the fasteners are described in further detail in reference to FIGS. 5B-5E. Further details and implementations of the interconnecting member 506 and associated components are described in reference to U.S. patent application Ser. No. 15/254,961, filed on Sep. 1, 2016, the entire contents of which is incorporated by reference herein.

FIG. 5B is a perspective view 500b of an example implementation of an interconnecting member 506 mated to a flexible membrane fastener 518, according to the present disclosure.

The view 500b shows a section of the membrane edge 532 of the flexible membrane 110 attached to the flexible membrane fastener 518. The flexible membrane fastener 518 is a fastener that detachably affixes the flexible membrane 110 to the interconnecting member 506. In the depicted implementation, the flexible membrane fastener 518 includes a flexible membrane zipper half 512 extending along and fixably attached to the membrane edge 532. A flexible membrane zipper half 512 may include a zipper tape 502 and a series of zipper teeth 504 (also known as zipper elements) extending along and fixably attached to the zipper tape 502. The flexible membrane fastener 518 may be adapted to mate with the interconnecting member fastener 516. For example, as depicted, the interconnecting member fastener 516 includes an interconnecting member zipper half 514, which mates with the flexible membrane zipper half 512.

In some implementations, a special zipper may be used for the flexible membrane zipper half 512 and/or the interconnecting member zipper half 514. Many zippers are built such that one zipper half must always mate with a unique second zipper half. In such zippers, each zipper half may have a different number of zipper teeth for a given length of zipper tape, which may be true even of zipper halves that are designed to mate. For example, two zipper halves may only match up with each other, but not with other zipper halves with the same size teeth. Because each zipper half does not have the same or similar number of teeth for the same or similar length of zipper tape, as zipper halves are mated, the overall length of each zipper half may not match. This problem is particularly pronounced on a long zipper, such as may be included on the interconnecting member 506. Accordingly, a special zipper may be used so that the zipper halves, as described herein, may be interchangeable. For example, each of the flexible membrane zipper half 512 and the interconnecting member zipper half 514 may be manufactured such that they are each interchangeable with other zipper halves of similar tooth size without significantly altering the overall zipper length when the two unrelated halves are joined together. One example of zipper halves that may be used to allow interchangeability may be the Musi™ zipper made by the YKK® company, however, it should be noted that other manufacturers may also make suitable zipper halves that allow interchangeability.

It should be noted that, although the flexible membrane fastener 518 and the interconnecting member fastener 516 are described as including a zipper/zipper halves, the fasteners may include other suitable fasteners, such as Velcro, magnets (e.g., a string of magnetic snaps, a magnetic strip, etc.), a series of snaps, a series of buttons, or any other suitable quick release mechanism.

The interconnecting member 506 illustrated in FIG. 5A-5E may include an interconnecting member fastener 516, an interconnecting member body 520, and an attachment member 508. The interconnecting member body 520 may have a rectangular shape defining a first longitudinal edge 548 and a second longitudinal edge 552. The attachment member 508 may be attached to the interconnecting member body 520 along the first longitudinal edge 548 and the interconnecting member fastener 516 may be attached to the interconnecting member body 520 along the second longitudinal edge 552.

The interconnecting member body 520 may be constructed of the same or similar material as the flexible membrane 110 or the interconnecting member body 520 may be constructed of a different material that is strong enough to bind the attachment member 508 to the interconnecting member fastener 516 (as well as resist any tension placed on the interconnecting member 506 from by the flexible membrane 110 or hard shell 420). For example, the interconnecting member body 520 may be constructed of fabric, canvas, mesh, vinyl, nylon, polyester, etc. In some instances, the interconnecting member body 520 may be reinforced with additional layers of material and/or may be treated for weather resistance.

The interconnecting member body 520 may have various sizes depending on the implementation. For example, the width of the interconnecting member body 520 (e.g., the distance between the first longitudinal edge 548 and the second longitudinal edge 552) may be 1-4 inches, although other implementations are possible.

In some implementations, the length of the interconnecting member body 520 may correspond to the distance along the perimeter edge 632 or 634 of one or more of the bottom shell member 106 and top shell member 104, depending on the implementation.

In some instances, the tent system 102 may also include two or more additional interconnecting members 506 for attaching an additional flexible membrane 110, portion of a flexible membrane 110, cover, or annex. It should be noted that other lengths and widths are possible without departing from the scope of the techniques described herein.

The attachment member 508 is configured to attach or otherwise connect with the hard shell 420. For example, the attachment member 508 may be attached to the interconnecting member body 520 along a first longitudinal edge 548. In some implementations, the attachment member 508a may be configured for insertion or other interaction with an attachment member receptacle (not shown). An attachment member receptacle may include a groove or channel defined by or attached along the perimeter edge 632 or 634 into which the attachment member 508a may be received. For example, the attachment member 508 may be sized for insertion into an attachment member receptacle, so that when the attachment member 508a is inserted into the attachment member receptacle, the attachment member 508a and one or more of the top shell member 104 and the bottom shell member 106 are fixably attached together. In some instances, the fit of the attachment member 508 and the attachment member receptacle may be tight enough to form a watertight seal.

In some implementations, the attachment member 508a may include adhesive, screws, clamped fabric, a bolt cord 544, or other means of attaching the interconnecting member body 520 to the bottom shell member 106 or top shell member 104. In some implementations, the attachment member 508a may include a bolt cord 544 or welt cord. For example, the attachment member 508a may include a cord sewn into or otherwise connected to a longitudinal edge 548 of the interconnecting member body 520. Suitable materials for the cord may include a rope, a plastic or rubberized strand, cloth piping, roll of fabric, etc.

The interconnecting member fastener 516 may be any fastener configured to attach the interconnecting member body 520 to the flexible membrane 110 (e.g., to the flexible membrane fastener 518). The interconnecting member fastener 516 may be configured to mate with any one of a plurality of different flexible membrane fasteners 518, so that when the interconnecting member fastener 516 and flexible membrane fastener 518 are mated, the interconnecting member 506 and flexible membrane 110 are detachably, but securely, connected. The interconnecting member fastener 516 may be attached to the interconnecting member body 520 along the second longitudinal edge 552 of the interconnecting member body 520.

In the implementation depicted in FIG. 5B, the interconnecting member fastener 516 may include an interconnecting member zipper half 514. The interconnecting member zipper half 514 may have a zipper tape 522 and a series of zipper teeth 504 extending along and fixably attached to the zipper tape 522. The interconnecting member zipper half 514 may be configured to attach to any one of a plurality of different flexible membrane zipper halves 512. Accordingly, one or more different flexible membranes 110 may interchangeably connected to the interconnecting member 506. For example, the interconnecting member zipper half 514 may be of the special zipper types described above in reference to the flexible membrane zipper half 512.

FIG. 5C is a perspective view 500c of an example implementation of an interconnecting member 506 mated to a flexible membrane fastener 518, according to the present disclosure. The interconnecting member 506 illustrated in FIG. 5C is the same as that described in reference to FIG. 5B, however the attachment member 508b is illustrated as a different configuration. For example the attachment member 508b illustrated in FIG. 5C may be adapted to be sewn, glued (e.g., using adhesive), or otherwise attached to the bottom shell member 106 and/or top shell member 104. For instance, the attachment member 508b may be glued along a perimeter edge of one or both of the bottom shell member 106 and the top shell member 104.

FIG. 5D is a perspective view 500d of an example implementation of an interconnecting member 506, according to the present disclosure. As described above, the interconnecting member 506 may be a gimp 542, which includes a bolt cord 544. The bolt cord 544 may include a cord longitudinally attached to the gimp body 546 along a first longitudinal edge 548. The bolt cord 544 may be adapted for insertion into an attachment member receptacle of the hard shell 420. For example, the bolt cord 544 may interact with a bottom or top shell member 104 by sliding into an attachment member receptacle attached to a perimeter edge of the bottom or top shell member 104. In some implementations, because the bolt cord 544 may be difficult to slide into and/or out of an attachment member receptacle, the bolt cord 544 may be attached to the bottom shell member 106 or top shell member 104 at the factory and may not be easily removable by a user. Moreover, although the attachment member 508 may be another mechanism than a bolt cord 544, as described above, the attachment member 508 may generally be a permanent or semi-permanent installation, so that it is difficult to easily or quickly remove from the hard shell 420, or install and align on the hard shell 420.

Further, as described above, the gimp 542 may include an interconnecting member fastener, such as a gimp zipper half 550 longitudinally attached to the gimp body 546 along the second longitudinal edge 552. An interconnecting member zipper half, such as the gimp zipper half 550 allows the flexible membrane 110 to be quickly attached or removed from the hard shell 420. Further the gimp zipper half 550 automatically aligns and securely attaches the flexible membrane 110 to the bottom shell member 106 or top shell member 104.

FIG. 5E is a perspective view 500e of an example implementation of an interconnecting member 562 (which is an implementation of the interconnecting member 506), according to the present disclosure. The interconnecting member 562 may include an attachment member 560 along a first longitudinal edge 572 of an interconnecting member body 568. The interconnecting member 562 may include a first interconnecting member fastener 564 and a second interconnecting member fastener 564 each attached to the interconnecting member body 568 along a second longitudinal edge 574. Similar to the interconnecting member fastener 516 described elsewhere herein, the second interconnecting member fastener 566 may include an interconnecting member zipper half 514 with zipper tape 522 and series of zipper teeth 504 fixably attached to the zipper tape 522.

The second interconnecting member fastener 566 may be configured to mate with any one of a plurality of different flexible membrane fasteners 518. For example, the second interconnecting member fastener 566 may mate with a second flexible membrane 110 (e.g., having a second flexible membrane fastener 518, which may include a second flexible membrane 110 defining a second membrane edge 532 and a second flexible membrane fastener 518, as described above). For example, the first interconnecting member fastener 564 may connect a first flexible membrane 110 (e.g., a mesh or lightweight flexible membrane 110) and the second interconnecting member fastener 566 may connect a second flexible membrane 110 (e.g., a rainfly, weather resistant, insulating, or other flexible membrane 110).

In some implementations, the first interconnecting member fastener 564 and the second interconnecting member fastener 566 may be different lengths, so that the first interconnecting fastener 564 may mate with a first configuration of a flexible membrane 110 and the second interconnecting member 566 may mate with a cover or a second configuration of a flexible membrane 110 (e.g., a water-resistant or solid flexible membrane 110, etc.). For example, in some implementations, the first interconnecting fastener 564 may be configured to extend along three sides of a perimeter edge 632 or 634, but the second interconnecting fastener 566 may be configured to extend along four sides of a perimeter edge 632 or 634.

FIG. 6A is a top perspective view 600a of an example rooftop tent system 102 in a closed position. As illustrated in FIG. 6A, the hard shell 420 has a generally rectangular shape. The rectangular shape maximizes the interior volume of the tent system 102, while fitting conveniently on the top of a vehicle 120. As illustrated, the tent system 102 has a low-profile design thanks to features such as the recessed areas 604 and 606, the articulating mechanism 202 (not shown in FIG. 6A), and the shape of the hard shell 420.

FIG. 6A illustrates that the tent system 102 may have an aerodynamically sloped top portion 610 near the front end 612 of the tent system 102. The top shell member 104 may further have a recessed area 604 on the top to accommodate the utility rails 108 and/or any items (not shown) that may be attached to the utility rails 108. Further, in some implementations, the top shell member 104 may have aerodynamically designed recesses 606a and 606b running between the front end 612 and the back end 614 of the tent system 102. In some implementations, the top shell member 104 may form or have attached thereto raised support areas 616a, 616b, 616c, and 616d that support the utility rails 108. It should be noted that the recesses and/or raised support areas 616 described and shown are provided by way of example and should not be construed as limiting.

The tent system 102 may be designed to fit conveniently on the roof of a vehicle 120. For example, the tent system 102 may be sized so that its mounting hardware (e.g., racks, clamps, straps, etc., attached to the bottom or sides of the tent system 102) securely attaches to roof rails on the top of a vehicle 120. Similarly, the tent system 102 may be sized to balance its mountability on an average or specific vehicle 120 with an ability to provide sufficient interior space. According to some implementations, the dimensions of the tent system 102 may be 78-86 inches long, 50-60 inches wide, 38-46 inches tall when open, and 7-10 inches thick when closed. It should be noted that these dimensions may vary by three to six inches or more, depending on the implementation. It should further be understood that the systems and techniques described herein are applicable to tents and storage containers of many sizes and shapes.

In some implementations, the tent system 102 (or portions thereof, such as a top of the tent system 102) may be colored white or a similar light/heat reflecting color to prevent the tent system 102 from becoming hot. It is beneficial to prevent the tent system 102 from becoming hot to avoid compromising the material (e.g., fiberglass, plastic, etc.) that the hard shell 420 may be made out of. Additionally, it is desirable that the interior of the tent system 102 not become too warm for user comfort.

FIG. 6B is a top perspective view 600b of an example rooftop tent in an open position and without a flexible membrane 110 attached thereto. As illustrated in FIG. 6B, the top shell member 104 and the bottom shell member 106 may be individual components where the top shell member 104 moves away from the bottom shell member 106 when the tent system 102 is in an open position (e.g., as illustrated in FIG. 6B). As illustrated, the bottom shell member 106 includes a first rigid portion 626 that defines a first perimeter edge 634 and the top shell member 104 includes a second rigid portion 624 that defines a second perimeter edge 632. The first perimeter edge 634 and the second perimeter edge 632 may be adapted to mate when the tent system 102 is in a closed position, such that the bottom shell member 106 and the top shell member 104 define an interior cavity when the tent system 102 is in the closed position (e.g., as illustrated in FIG. 6A).

As illustrated, an articulating mechanism 202 may couple the bottom shell member 106 to the top shell member 104 and may bear against the top shell member 104 to transfer a weight of the top shell member 104 and the utility rails 108 to the bottom shell member 106 and/or the roof of the vehicle 120 when the tent system 102 is in the open position.

Figure 6C:
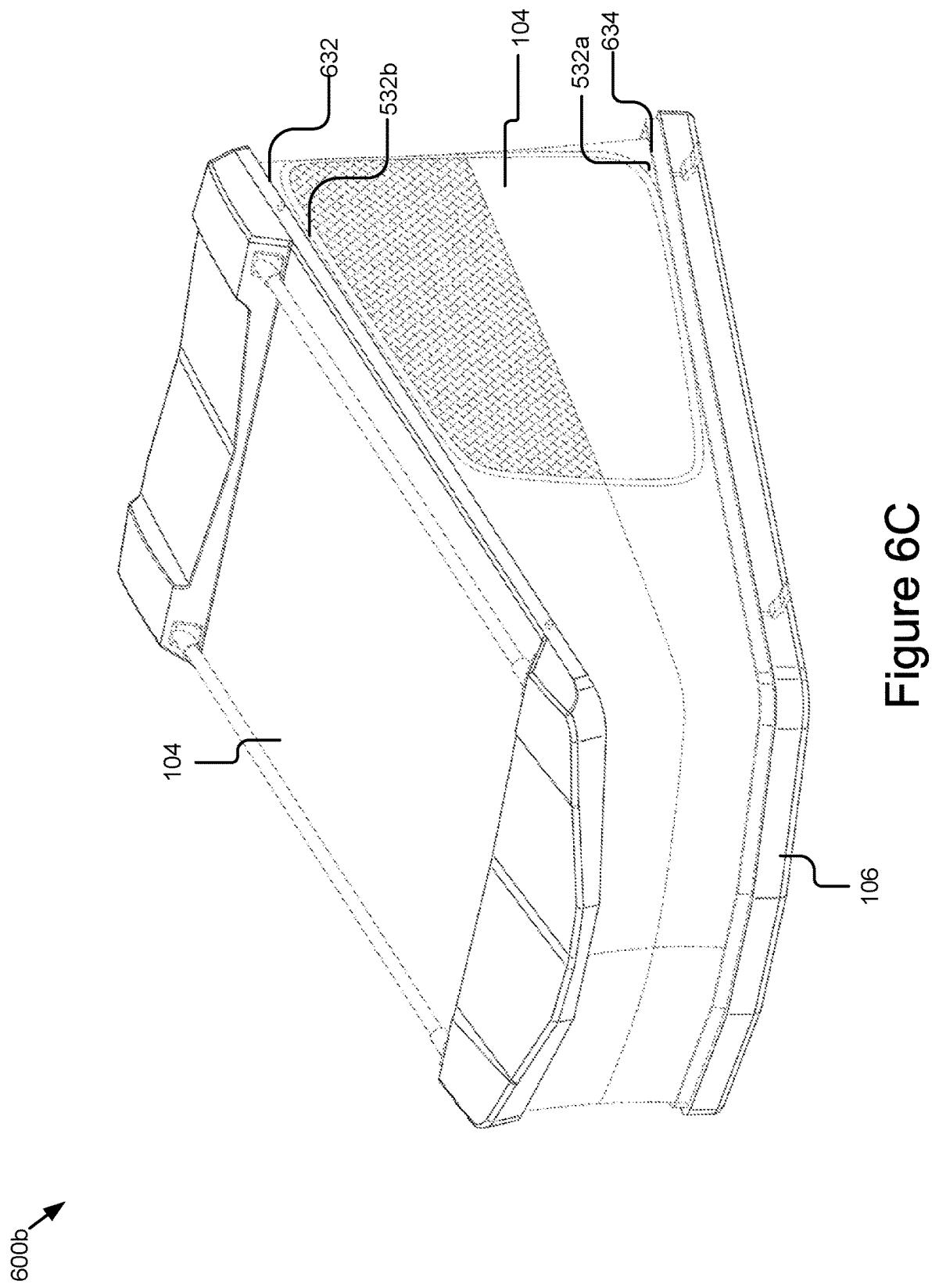

FIG. 6C is a top perspective view 600c of an example rooftop tent system 102 in an open position and with a flexible membrane 110 attached thereto. As illustrated, the flexible membrane 110 may extend between a first section of the first perimeter edge 634 of the bottom shell member 106 and a second section of the second perimeter edge 632 of the top shell member 104. For example, a first membrane edge 532a of the flexible membrane 110 may be adapted to connect to the first perimeter edge 634, and a second membrane edge 542b of the flexible membrane 110 may be adapted to connect to the second perimeter edge 632. In some implementations, the first membrane edge 532a and/or the second membrane edge 532b may include a flexible membrane fastener 518 (not shown in FIG. 6C), and the first perimeter edge 634 and/or the second perimeter edge 632 may include or have attached thereto one or more interconnecting members 506 (not shown in FIG. 6C) with interconnecting member fasteners 516 configured to detachably fasten to the flexible membrane fasteners 518.

Figure 7A:
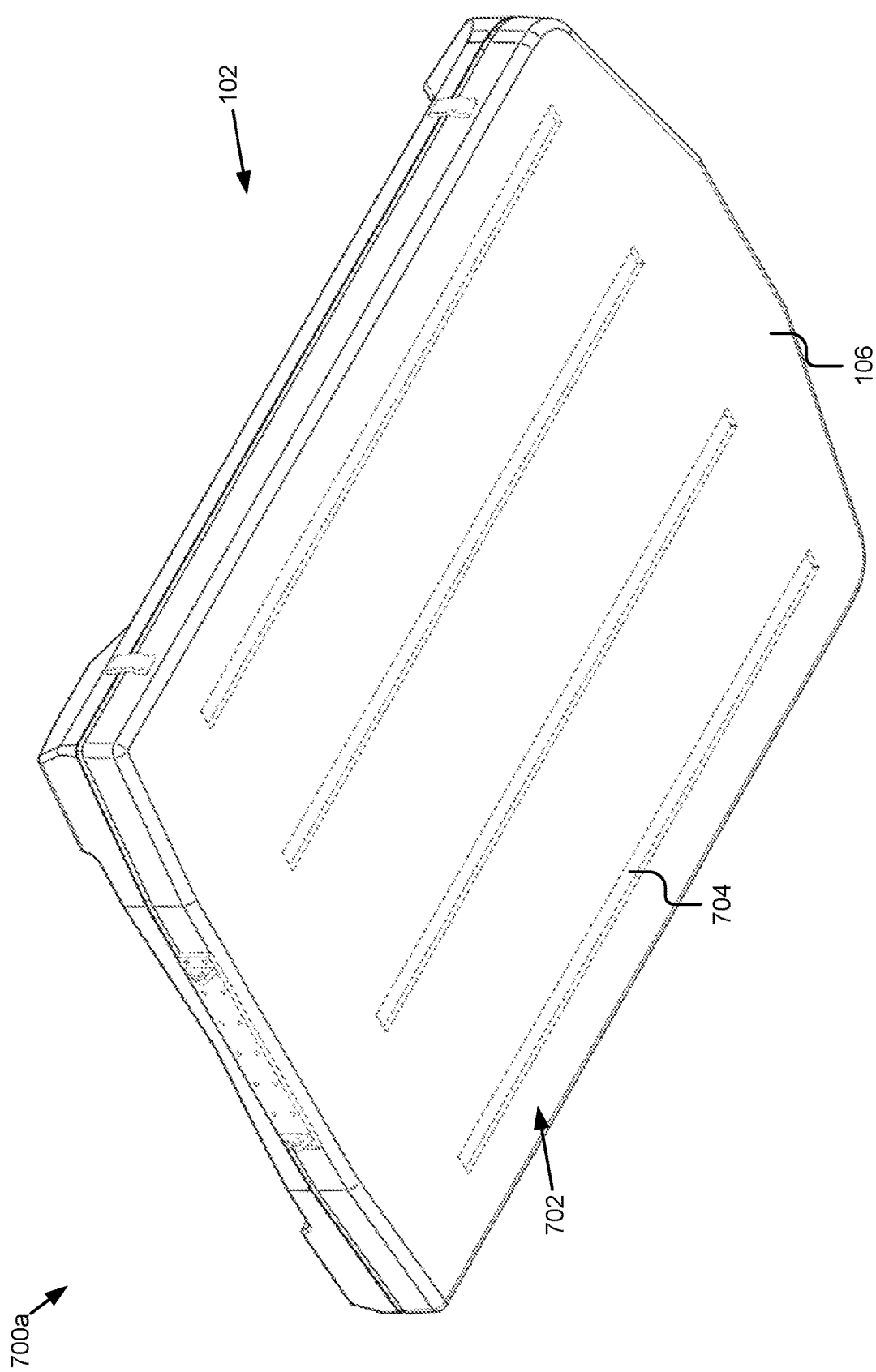
FIGS. 7A-7B are bottom perspective views of an example rooftop tent system.

FIG. 7A is a bottom perspective view 700a of an example rooftop tent system 102 in a closed position. The bottom 702 of the tent system 102 illustrates that the bottom shell member 106 may have one or more corrugations or elongated structures 704. The elongated structures 704 may include grooves into the bottom 702 (e.g., of the bottom shell member 106) or protrusions from the bottom 702 of the tent system 102. Protrusions (e.g., attached to the bottom shell member 106 or integrated with the structure of the bottom shell member 106) are less likely to impinge on the interior volume of the tent system 102 than grooves into the bottom 702 of the tent system 102. In some implementations, the elongated supports 704 may be configured to smooth out airflow along the bottom 702 of the tent system 102. The elongated supports 704 may also, or alternatively, provide rigidity to the bottom shell member 106 of the tent system 102, thereby better supporting the weight of a person within the tent system 102.

Although not shown in FIG. 7A, the bottom 702 may include mounting hardware, such as a bracket or cross members that extend between the left and right side (e.g., transverse or perpendicular to the elongated structures 704). The bracket or cross members may add rigidity to the bottom shell member 106 and/or facilitate mounting the tent system 102 to roof rails of a vehicle 120.

Figure 7B:
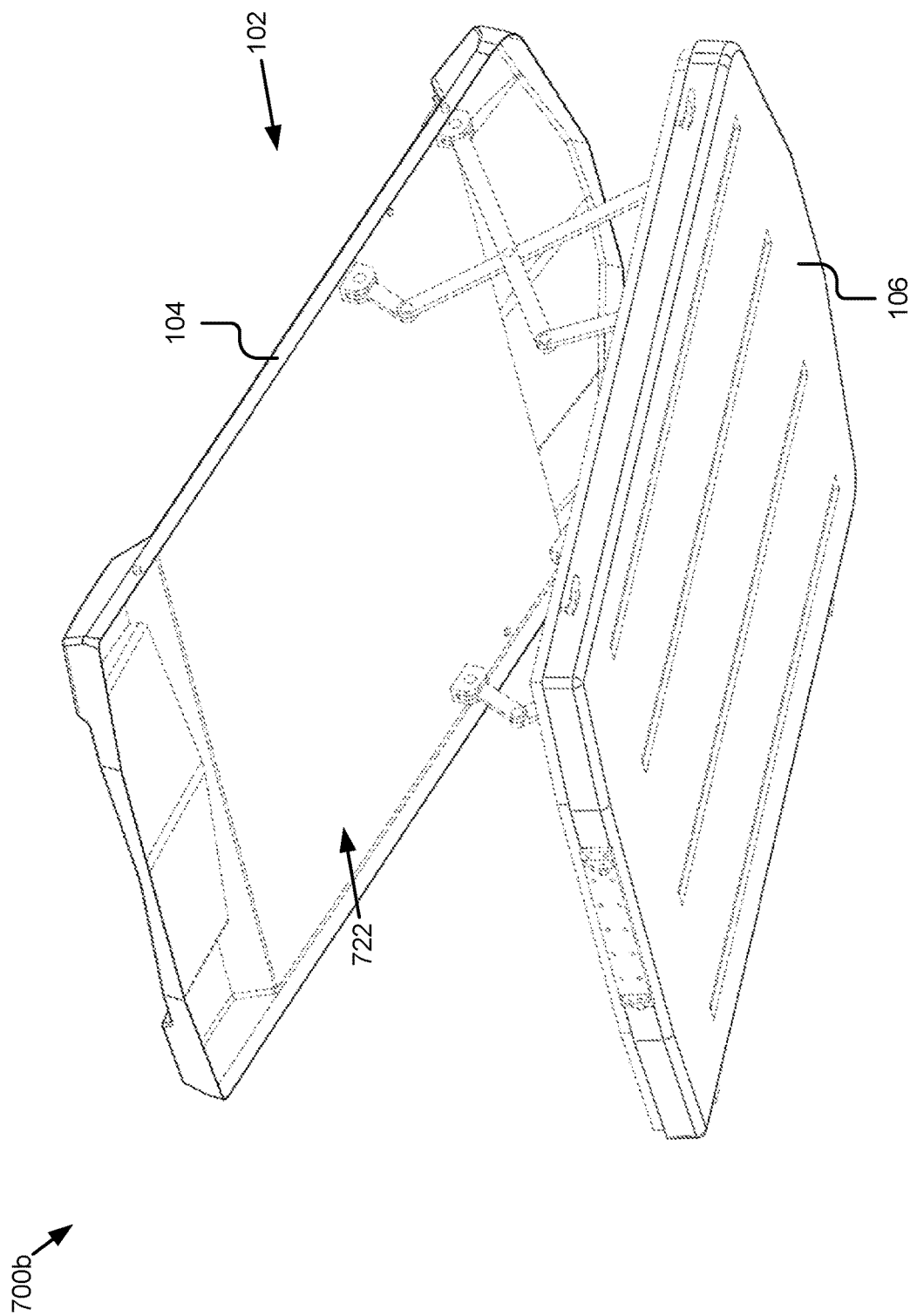

FIG. 7B is a bottom perspective view 700b of an example rooftop tent system 102 in an open position and without a flexible membrane 110. The view 700b illustrates an example interior structure 722 of the top shell member 104, according to some implementations. It should be noted that while no frame, such as an internal frame, is illustrated in FIG. 7B, certain portions of the bottom shell member 106 and/or top shell member 104 may be reinforced with a frame, brackets, or other reinforcing structures.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above described implementations, implementations, and examples, but by all implementations, implementations, and examples, and other equivalents within the scope and spirit of the invention as claimed.

The present disclosure describes an innovative technology relating to an adaptable tent system 802 with interconnecting member 806 (hereinafter "tent system"). The tent system 802 solves many of the shortcomings of existing tents, especially rooftop tents, such as described in the background section of this disclosure. The tent system 802 may include a tent base system 902 (hereinafter "base system"), a tent canopy 804 (hereinafter "canopy"), and an interconnecting member 806. The interconnecting member 806 may have an interconnecting member fastener 816 for connecting the interconnecting member 806 to the canopy 804. The interconnecting member 806 may also have an attachment member 1008 for connecting the interconnecting member 806 to the base system 902. For example, the interconnecting member 806 allows a base system 902 and canopy 804 to be easily separable so that the canopy 804 can be easily replaced, repaired, and/or stored. The interconnecting member 806, base system 902, and canopy 804 are described in further detail throughout this disclosure. In some implementations, due to the unique nature of the fasteners 816 and/or 818 (e.g., which may include a special zipper) multiple canopies 804 can be interchangeably mounted to the base system 902, or even simultaneously mounted to the base system 902, to provide adaptability to various weather conditions or user needs. Accordingly, users, warehouses, and stores may store fewer base systems 902 and more canopies 804 while still satisfying the diverse needs of users.

According to some implementations, the tent system 802 may include an interconnecting member 806 with an interconnecting member fastener 816 running along a first longitudinal side 1112 of the interconnecting member 806. In some implementations, the body 1006 of the interconnecting member 806 may be constructed of the same or similar material as the canopy 804 and may be attached to the base system 902, for example, using a bolt cord 1104 running along a second longitudinal side 1108 of the interconnecting member body 1006. The interconnecting member 806 may allow quick release of the canopy 804 from the base system 902, for example, a user may remove the canopy 804 from the base system 902 simply by unzipping along the perimeter of the canopy 804. In some implementations, the interconnecting member 806 may also, or alternatively, be used to attach an annex tent 1402 underneath the base system 902. In some implementations, the interconnecting member 806 may include a gimp 1102 (e.g., a narrow trim or strip of fabric).

Figure 8:
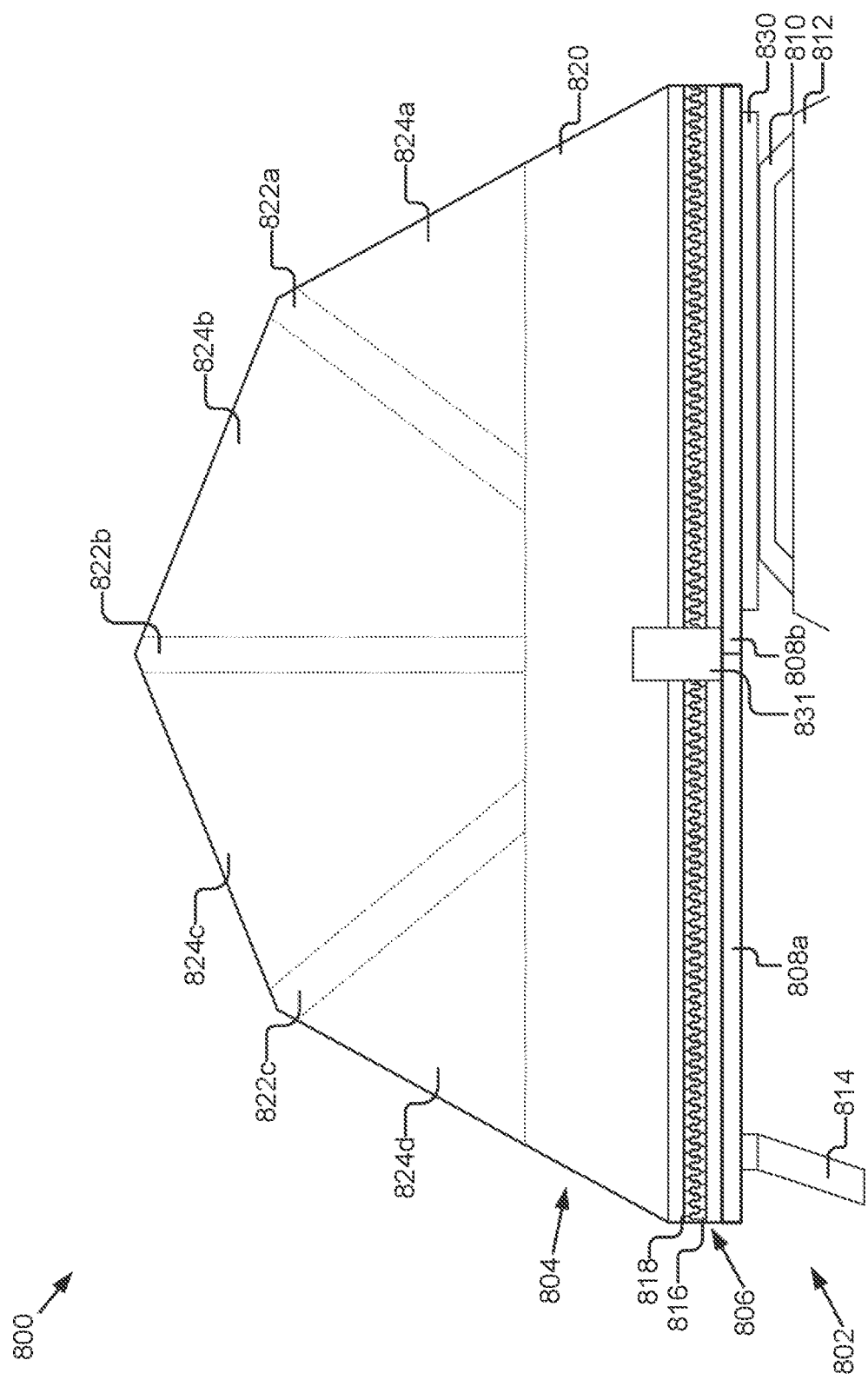
FIG. 8 is a side view of an example implementation of a tent system, according to the present disclosure, in an open position.
Figure 9A:
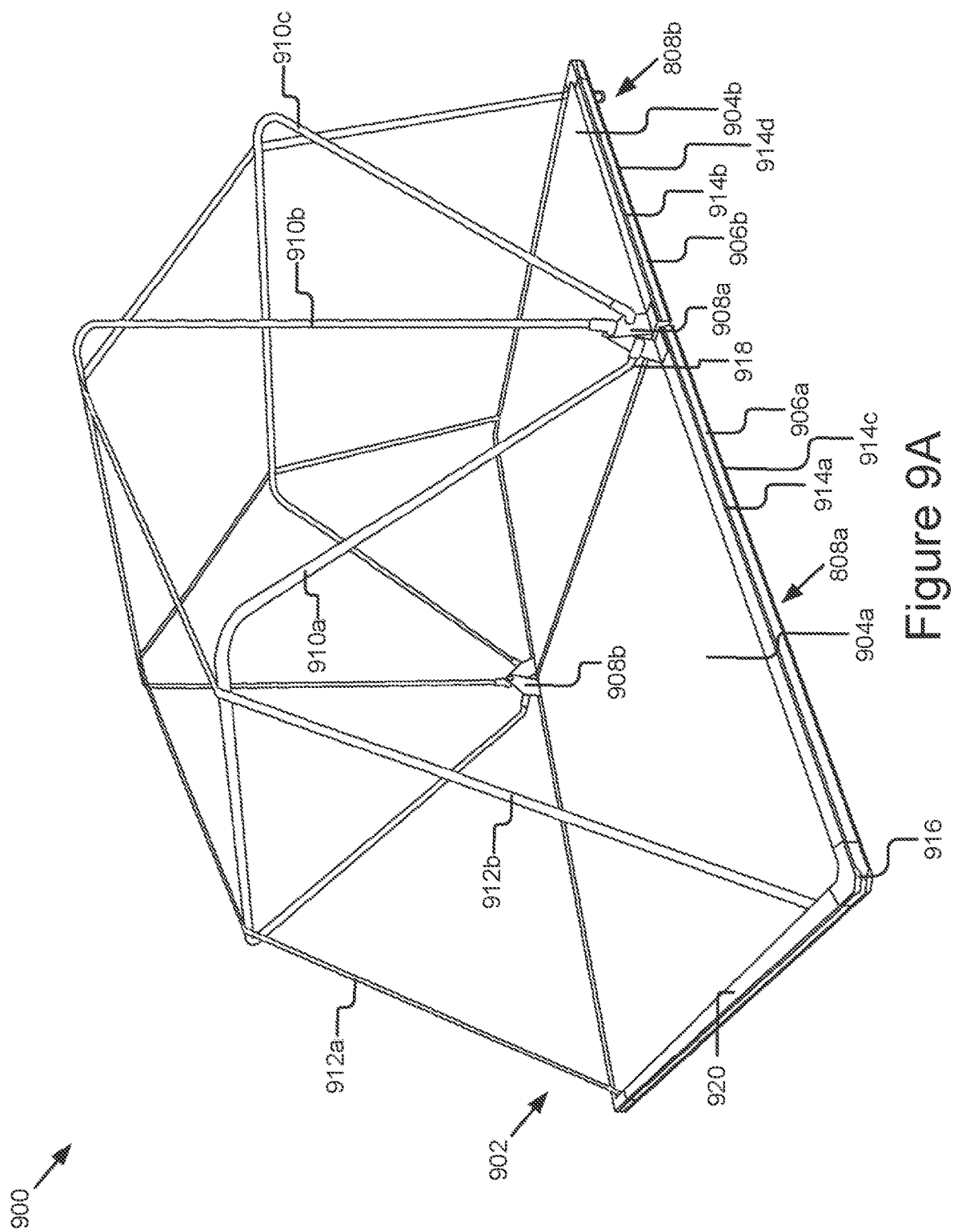
FIG. 9A is a perspective view of an example implementation of a base system, according to the present disclosure, in an open position.
Figure 9B:
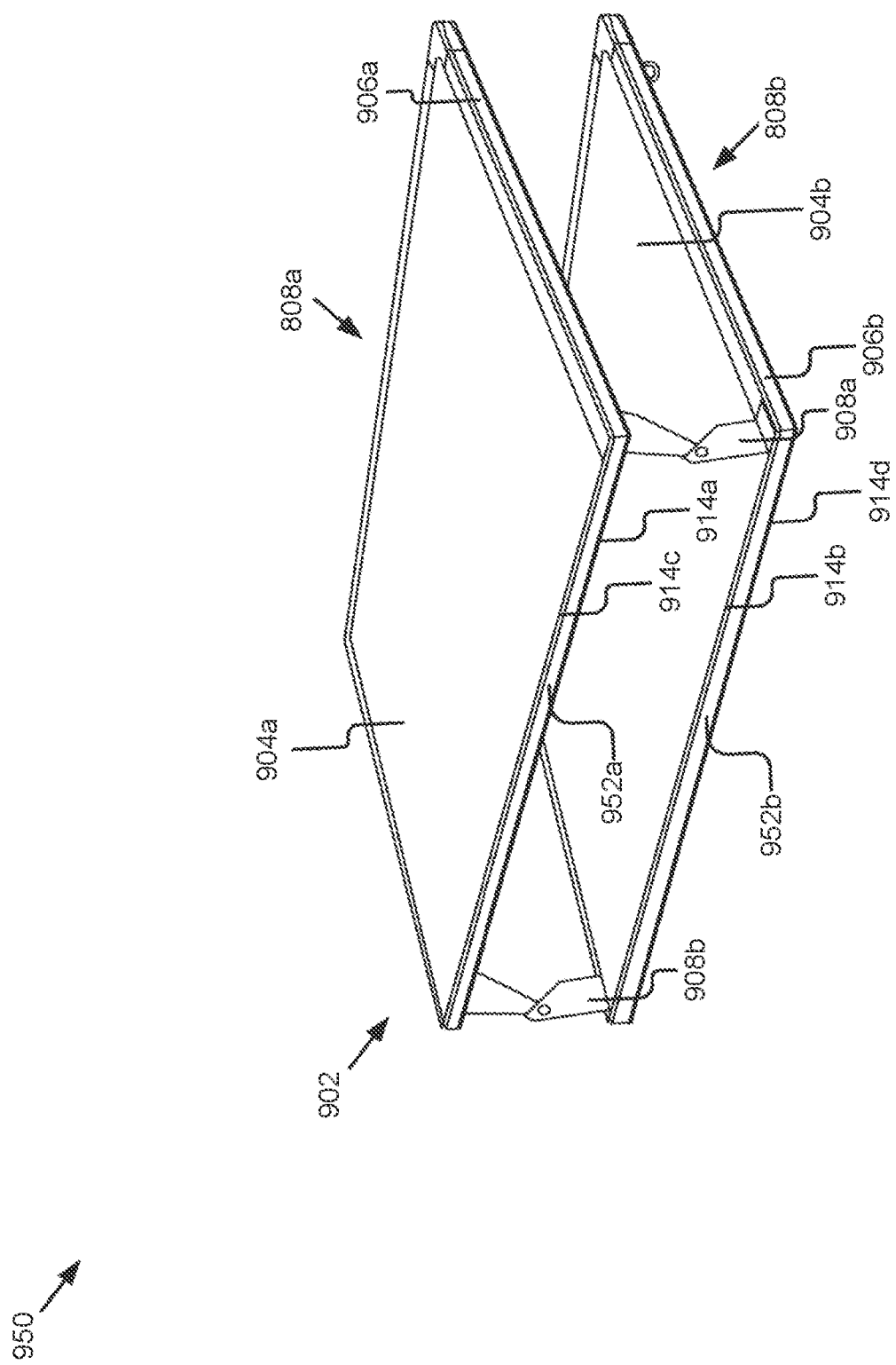
FIG. 9B is a perspective view of an example implementation of a base system, according to the present disclosure, in a closed position.

FIG. 8 is a side view 800 of an example implementation of a tent system 802 in an open position (e.g., an open position is shown in FIG. 9A and a closed position is shown in FIG. 9B). In some implementations, the tent system 802 may include a canopy 804, an interconnecting member 806, and one or more base members 808a and 808b (e.g., the base members 808a and 808b are components of a base system 902).

Each of the base members 808a and 808b may include a rigid surface defining a perimeter edge 906 and may be attachable to a roof rack 810 of a vehicle 812. Additionally, a base member 808 may include, or have attached thereto, a support 814 to support the base member 808. In some implementations, the base member 808 may include a channel along the perimeter edge 906 which is configured to receive and retain an attachment member 1008 of the interconnecting member 806.

A base member 808 may include mounting hardware, such as transversely mounted rails 830 configured to rest perpendicularly across a standard vehicle roof rack 810 (although the rails 830 or other mounting hardware may have other configurations). In some implementations, the mounting hardware may include welds, bolts, or any other hardware, which may be used to securely attach the base member 808 to the vehicle 812. The base members 808 are described in further detail throughout this disclosure, especially in reference to FIGS. 9A and 9B.

The support 814 may include any mechanism configured to support the base member 808. For example, in some implementations, the support 814 may be a ladder attached to the bottom or side of the base member 808. The ladder may then be used both to support the base member 808 and to enable a user to climb into the tent system 802. The support 814 may be attached to the base member 808 using bolts, rivets, adhesive, or any other mounting mechanism. In some implementations, the support 814 may fold along the surface of the base member 808 for storage when not needed to support the base member 808. In some implementations, the support 814 may be slidably mounted to the base member 808, allowing the support 814 to be deployed under or adjacent to the base member 808 to provide vertical support, and then to slide or retract into a cavity formed in the base member 808 for storage.

The interconnecting member 806 may serve as an adapter between the base member 808 and the canopy 804 allowing the canopy 804 to be detachably securable to the base member 808. Thus, a single base member 808 may be used with a variety of canopies 804. In some implementations, the interconnecting member 806 may include an interconnecting member body 1006, an attachment member 1008 (the interconnecting member body 1006 and attachment member 1008 are described in further detail in reference to FIG. 10), and an interconnecting member fastener 816. The interconnecting member body 1006 connects the attachment member 1008 to the interconnecting member fastener 816, among other functionality, as described elsewhere herein. The attachment member 1008 may fixably attach the interconnecting member 806 to the base member 808. The interconnecting member fastener 816 may detachably mate with a canopy fastener 816 of the canopy 804. The interconnecting member 806 is described in further detail throughout this disclosure, for example in reference to FIGS. 10-14. It should be noted that although the interconnecting member fastener 816 and canopy fastener 818 are shown including zippers, other implementations for fastening the canopy 804 to the interconnecting member 806 are possible and contemplated herein. The canopy fastener 818 is described in further detail elsewhere herein, for example, in reference to FIG. 10.

The canopy 804 covers at least a portion of the base member 808 to form the tent roof and/or sides. In some implementations, the canopy 804 includes a flexible membrane, which may include or define a membrane edge 832. The membrane edge 832 may include a canopy fastener 818 affixed thereto for connecting to the interconnecting member fastener 816. In some implementations, the canopy 804 may include a bottom pan membrane (not shown) with the membrane edge 832 being located along the intersection between the bottom pan membrane and the flexible membrane. In some implementations, the canopy 804 may include a slit flap 831, as described in reference to FIG. 13.

The flexible membrane may be constructed of any type of flexible material, such as fabric, canvas, mesh, vinyl, nylon, polyester, etc. In particular, one of the benefits of the adaptable tent system 802 described herein is the ability to use additional, fewer, or different materials to construct the flexible membrane than are used in existing tents. For example, the flexible membrane may be constructed entirely (or mostly) of mesh, because the tent system 802 described herein may allow an additional canopy 804 (e.g., constructed of water resistant canvass) to be connected to the base member 808, in addition to or in place of the first mesh canopy 804.

For example, the interconnecting member 806 enables a user to quickly and easily replace a mesh canopy 804 (e.g., for dry or summer use) with a water resistant canopy 804 (e.g., for rain). In some implementations, the interconnecting member 806 may enable a first canopy 804 (e.g., a water resistant canopy 804) to be attached to the base member 808 at the same time as a second canopy 804 (e.g., a mesh canopy 804). For example, the interconnecting member fastener 816 is configured to quickly and interchangeably align any canopy fastener 818 and affix the corresponding canopy(ies) 804 to the base member 808.

In some implementations, the canopy 804 may be shortened slightly over a tent canopy where no interconnecting member 806 is used, so that the combined size of the interconnecting member 806 and the canopy 804 corresponds to the size of the tent canopy where no interconnecting member 806 is used.

As shown in FIG. 8, the flexible membrane of the canopy 804 may be constructed of one or more component membranes. For example, in the illustrated implementation, the flexible membrane includes a solid membrane 820, reinforcing membranes 822a, 822b, and 822c, and one or more mesh membranes 824a, 824b, 824c, and 824d. For example, the mesh membrane 824 may be the top two thirds of the flexible membrane of the canopy 804 and the bottom one third of the flexible membrane may include the solid membrane 820.

The tent system 802 provides a means (e.g., via the interconnecting member 806) to replace or supplement a substantially mesh canopy 804 with a separate water-resistant canopy 804 (e.g., a canopy 804 that is solid and/or treated so that it is substantially impermeable to rain). In some instances, a second canopy 804 can be attached to the base system 802 in place of a first canopy 804. In some instances, a second canopy 804 can be attached to the base system 802 over the top of a first canopy 804 to provide weather protection for all or most of the first canopy 804. The interconnecting member 806 allows the second canopy 804 to be quickly and securely attached to the base system 802, thereby providing better weather protection than possible with existing tents. Because the second canopy 804 improves weather protection, the first canopy 804 can include a flexible membrane made completely or mostly from a breathable material, such as a mesh membrane 824.

In some implementations, the canopy 804 may include one or more reinforcing membranes 822a-822c, which may be constructed of heavier material (e.g., than the mesh membrane 824) and provide reinforcement to the canopy 804, especially where the flexible membrane overlaps tent poles 910. For example, because the canopy 804 illustrated in FIG. 8, is constructed largely of mesh material, the reinforcing membranes 822a-822c provide additional strength to the canopy 804 in areas of higher stress, such as, over the poles 910. The heavier material of the reinforcing membranes 822 may include fabric, canvas, vinyl, nylon, polyester, etc., as discussed elsewhere herein. The reinforcing membranes 822 may include strips of material that are sewn, welded, or otherwise attached to the mesh membranes 824, as shown in FIG. 8.

The vehicle 812 may include any vehicle capable of supporting the tent system 802, however, it should be understood that the tent system 802 may be used in other configurations. For example, although the tent system 802 is particularly beneficial for use when mounted to a vehicle 812, due to base member's 808 rigid surface, the tent system 802 may be placed on the ground, or mounted to any other object (e.g., a tree, ropes, a stand, etc.).

FIG. 9A is a perspective view 900 of an example implementation of a base system 902 in an open position. The base system 902 may include one or more base members 808a and 808b. As shown, the base system 902 may include one or more rigid surfaces 904a (e.g., of a first base member 808a) and 904b (e.g., of a second base member 808b), each rigid surface 904a and 904b defining a perimeter edge 906a and 906*b*, respectively. The rigid surfaces 904*a* and 904*b* may be pivotally attached together using one or more hinges 908*a* and 908*b*. Further, in some implementations, the base system 902 may include one or more poles 910*a*, 910*b*, and 910*c* connected to the hinges 908 or to one or both of the rigid surfaces 904*a* and 904*b*. The rigid surfaces 904, hinges 908, and poles 910 are each described in more detail below. Further, it should be noted that aspects of certain components may be described in reference to one component, but these aspects may be applicable to none, some, or all of the components. For example, features described in reference to base member 808*a* may be equally applicable to base member 808*b* and vice versa.

As illustrated in FIG. 9A, the second rigid surface 904*b* may be positioned on a substantially horizontal plane with the first rigid surface 904*a* when the tent system 802 is in an open position. Further, the second rigid surface 904*b* may be adapted to fold over the first rigid surface 904*a* when the tent system 802 is in a closed position, for example, as shown in FIG. 9B.

The rigid surfaces 904*a* and 904*b* may be solid or include some other construction, such as a flat top and an interior constructed using honeycombs, corrugations, foam, hat channels, I beams, or any other construction that allows the rigid surface to remain substantially rigid when supporting the weight of a user and/or gear inside the tent, especially when the tent system 802 is in an open position. A rigid surface 904 may be constructed of steel, aluminum, fiberglass, wood, carbon fiber, or one or more other materials that provide sufficient strength to support the weight of a user and/or gear.

Each rigid surface 904 may be a rectangular prism, although other implementations are possible. In some implementations, each rigid surface 904 may have one or more perimeter edges 906. For example, as shown, a first rigid surface 904*a* has a first perimeter edge 906*a* and a second rigid surface 904*b* has a second perimeter edge 906*b*. In some implementations, the rigid surface 904 has an attachment member receptacle 914 along the perimeter edge 906 (e.g., each perimeter edge 906*a* and 906*b* may define one or more channels 914*a*, 914*b*, 914*c*, and 914*d*). For example, an attachment member receptacle 914 may extend along three sides of the perimeter edge 906 of each rigid surface 904. In implementations where the base system 902 includes two rigid surfaces 904*a* and 904*b*, the attachment member receptacle 914 may extend around four sides of the perimeter edge of the base system 902 (e.g., six total sides of the perimeter edges 906*a* and 906*b* of the two rigid surfaces 904*a* and 904*b*). In another example, the attachment member receptacle 914 may extend along four sides of the perimeter edge 906 of a rigid surface 904 in implementations where the base system 902 includes a single rigid surface 904. It should be understood that other implementations are possible and contemplated herein, for example, a first rigid surface 904*a* may define an attachment member receptacle 914*a* along four sides of its perimeter edge 906*a*, while a second rigid surface 904*b* may define an attachment member receptacle 914*b* along only three sides of its perimeter edge 906*b*. The rigid surfaces 904*a* and 904*b* may also include second attachment member receptacles 914*c* and 914*d*, respectively. For example, as described in reference to FIG. 13, such a configuration of different sized interconnecting members 806 would allow features such as a cover to be attached when the tent system 802 is in a closed position.

Each attachment member receptacle 914 may be adapted to receive and retain an attachment member 1008. For example, the attachment member receptacle 914 may be a channel formed within the perimeter edge 906 or formed within a component 920 attached to the perimeter edge 906. The channel may be shaped in such a way as to receive an attachment member 1008, such as a bolt cord 1104. In particular, the attachment member receptacle 914 may be configured so that an attachment member 1008 may be attached thereto, but so that the attachment member 1008 is not easily removed once inserted into the attachment member receptacle 914. For example, the attachment member 1008 may be formed within or inserted into the attachment member receptacle 914 at the factory (e.g., using screws or specialized tools). The attachment member receptacle 914 may have an opening 916 through which the attachment member 1008 can be inserted into the attachment member receptacle 914. Although an opening 916 is shown at the corner of the rigid surface 904 in the example of FIG. 9A, it should be understood that other implementations are possible. For example, the tent system 802 according to the techniques described herein may include an opening at a single corner of the rigid surface 904 or at the end of an attachment member receptacle 914.

Although some implementations of the tent system 802 enable a single attachment member receptacle 914*a* to be used, some implementations provide a second attachment member receptacle 914*c* to be included along a perimeter edge 906 of one or more of the rigid surfaces 904. In implementations where a second attachment member receptacle 914*c* is provided, the tent system 802 may provide for a second interconnecting member 806 to be connected to the same base member 808*a*. For example, in implementations where a second interconnecting member 806 is used in a second attachment member receptacle 914*c*, the second interconnecting member 806 may be slightly wider than a first interconnecting member 806 used in a first attachment member receptacle 914*c* (e.g., wider by the width of the thickness of the rigid surface 904*a*). For example, if the thickness of the rigid surface 904*a* is one inch, the distance between the first attachment member receptacle 914*a* and the second attachment member receptacle 914*c* is one inch, then the second interconnecting member 806 may be one inch wider than the first interconnecting member 806 so that canopies 804 of the same size can be attached to each of the first and the second interconnecting members 806. Similarly, a second canopy 804 (e.g., a fly or rain-resistant canopy 804) may be slightly longer than a first canopy 804 to accommodate for the additional thickness of the rigid surface 904.

As shown in the depicted implementation, the first attachment member receptacle 914*a* may be positioned along a top corner of the perimeter edge 906*a* and the second attachment member receptacle 914*c* may be positioned along a bottom corner of the perimeter edge 906*a*. In some implementations, the first attachment member receptacle 914*a* and the second attachment member receptacle 914*c* may both be positioned on the top of the rigid surface 904*a* along the perimeter edge 906*a*.

The hinge(s) 908 may include any type of hinge mechanism which allows the base system 902 to fold to a closed position (e.g., as in FIG. 9B), but remain substantially flat in an open position. Further the pivot point of the hinge 908 may be raised off the plane formed by the rigid surfaces 904, so that when the base system 902 is folded in a closed position, there is enough space between the rigid surfaces 904 to fit any poles 910 or other components (e.g., canopy (ies) 804, interconnecting member(s) 806, pads, etc.). Each side of the hinge 908 may be bolted to, welded to, integrally formed with, or otherwise attached to the rigid surfaces 904.

The poles 910 may be configured to form a frame that supports the canopy 804 when the canopy 804 is mounted to the base system 902. In some implementations, the poles 910 may be integrated with or attached to the canopy 804 and attachable to receptacles in one or more base members 808.

The poles 910 may be constructed of a rigid material, such as metal (e.g., aluminum, steel, etc.), plastic, carbon fiber, etc. The cross section of each pole 910 may be circular, flat, rectangular, or any other sufficiently strong shape. In some implementations, the poles 910 may have a three sided rectangular shape with rounded corners, as shown in FIG. 9A. In some implementations, the poles 910 may have other shapes, such as half circles, octagons, straight poles, etc., without departing from the scope of this disclosure.

In some implementations, the poles 910 may be connected to the base system 902. For example, as shown, the poles 910 may be connected to the hinges 908. In some instances, the poles 910 may be connected to the hinge 908 to fold substantially flat when the base system 902 is in a closed position. For example, one or more of the poles 910 may include a bend 918 that is configured to allow the poles 910 to lay substantially flat when the base system 902 is in a closed position. In some implementations, the poles 910 may all be attached to and pivot about an axis of a hinge 908a and/or 908b, such that the poles 910 fold to a thickness no greater than that of the poles 910 themselves.

In some implementations, the poles 910 may be connected using one or more straps 912a and 912b. The straps 912 may be cables or strips of material constructed of fabric, metal, rope, or other flexible material. The straps 912 may be connected to the poles 910, wrapped around the poles 910, or not connected to the poles, for example. The straps 912 may further connect the poles 910 to one or both of the rigid surfaces 904, so that when the base system 902 is in an open position, the tension on the straps 912 opens the poles 910 to the appropriate angles. The straps 912 may facilitate spreading a canopy 804 over the base system 902, so that the poles 910 remain stationary while the canopy 804 is attached to the interconnecting member 806. Further, in some implementations, the tension on the straps 912 may further serve to support an unsupported rigid surface 904 (e.g., if rigid surface 904a is mounted to a vehicle, then the straps 912 may suspend the rigid surface 904b which is not directly mounted to the vehicle 812).

FIG. 9B is a perspective view 950 of an example implementation of a base system 902 in a closed position. As shown in FIG. 9B, the perspective view 950 illustrates a base system 902 with the rigid surface 904a of a first base member 808a folded over the rigid surface 904b of a second base member 808b into a parallel plane when the tent system 802 is in a closed position. The base system 902 is shown pivoting about the hinges 908a and 908b. It should be noted that other components of the tent system 802, such as the poles 910, the interconnecting member 806, and the canopy 804 are not shown in the perspective view 950 of FIG. 9B.

In some implementations, as illustrated in FIG. 9B, the rigid surfaces 904a and 904b may include one or more attachment member receptacles 914a, 914b, 914c, 914d extending along the inner sides 952a or 952b of the perimeter edge 906a and/or 906b, respectively. For example, in some implementations, the rigid surface 904b may include two attachment member receptacles 914b and 914d around the entirety of the perimeter edge 906b, including the inner side 952b (e.g., as discussed in reference to the implementation shown in FIG. 13). In some instances, the rigid surface 904a may include two attachment member receptacles 914a and 914c around every side of the perimeter edge 906a, except for the inner side 952a (e.g., as discussed in reference to the implementation shown in FIG. 12).

In some implementations, the tent system 802 may include a special interconnecting member 806 with an attachment member 1008 along the first longitudinal edge 1108 and a second attachment member 1008 along the second longitudinal edge 1112. Such special interconnecting member 806 may be configured to connect the inner side 952a of the first base member 808a to the inner side 952b of the second base member 808b. In some implementations, the special interconnecting member 806 may serve as a hinge 908. In some implementations, the special interconnecting member 806 may connect the inner side 952a of the first base member 808a to the inner side 952b of the second base member 808b to provide protection for the gap between the first and second base members 808, when the tent is in an open and/or a closed position. In such implementations, the interconnecting member body 1006 of the special interconnecting member 806 may be constructed of an elastic material and/or may be wide enough to bridge the gap between the first and second base members 808 (e.g., when the base system 902 is in a closed position, such as is shown in FIG. 9B).

Figure 10:
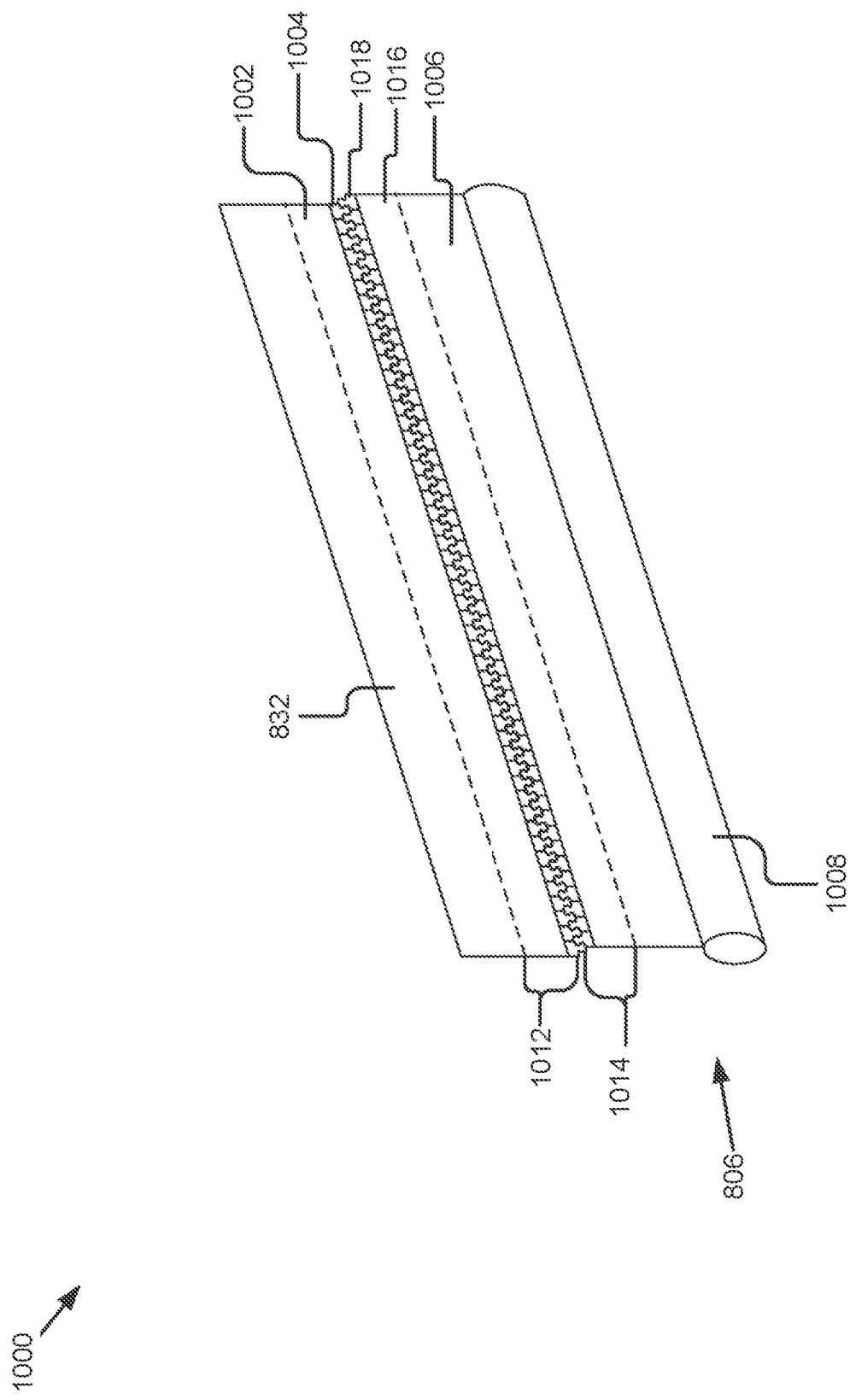
FIG. 10 is a perspective view of an example implementation of an interconnecting member mated to a canopy fastener, according to the present disclosure.
Figure 11:
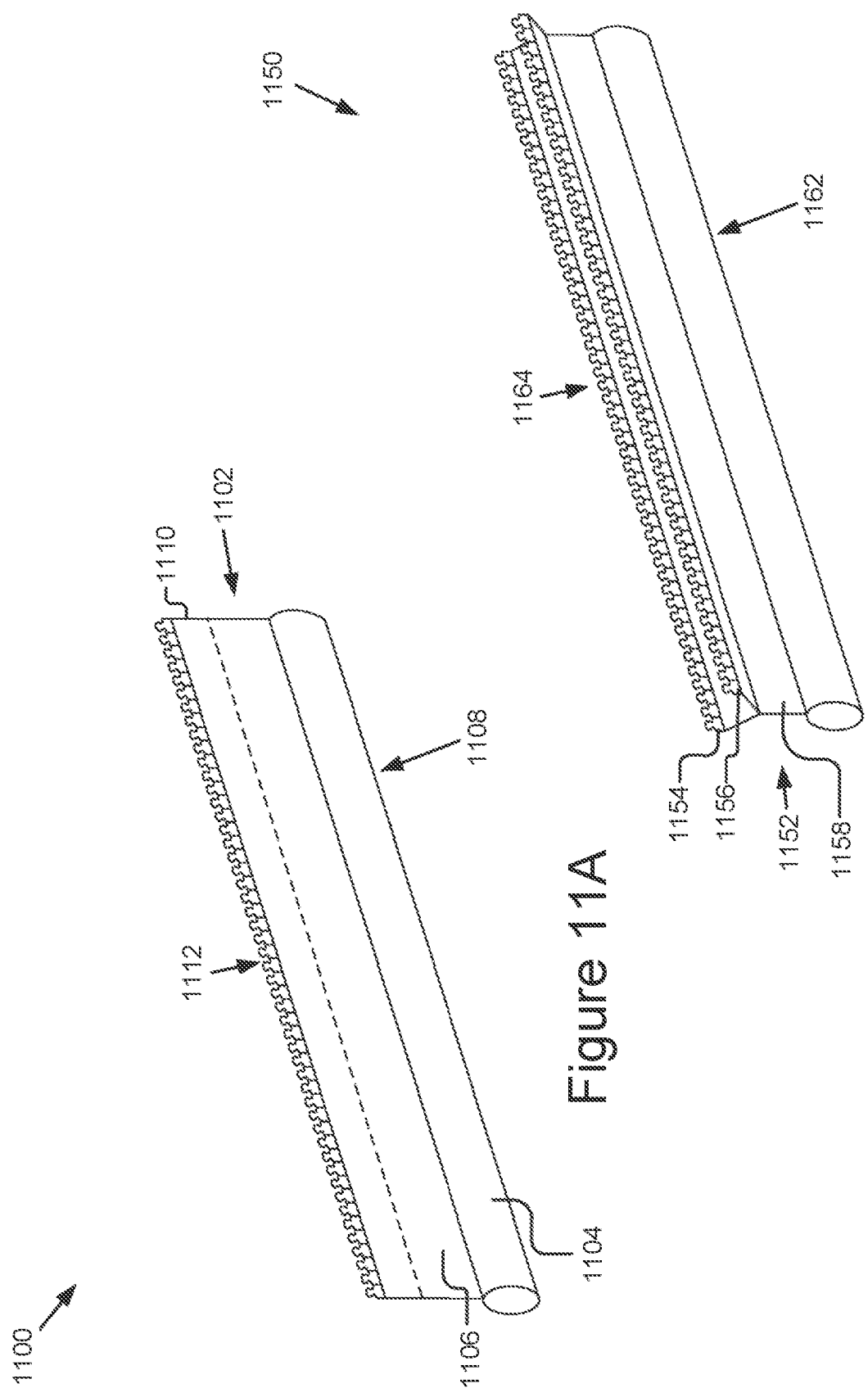
FIGS. 11A and 11B are perspective views of example implementations of interconnecting members, according to the present disclosure.

FIG. 10 is a perspective view 1000 of an example implementation of an interconnecting member 806 mated to a canopy fastener 818, according to the present disclosure.

The view 1000 shows a section of the membrane edge 832 of the canopy 804 attached to the canopy fastener 818. The canopy fastener 818 is a fastener that detachably affixes the canopy 804 to the interconnecting member 806. In the depicted implementation, the canopy fastener 818 includes a canopy zipper half 1012 extending along and fixably attached to the membrane edge 832. A canopy zipper half 1012 may include a zipper tape 1002 and a series of zipper teeth 1004 (also known as zipper elements) extending along and fixably attached to the zipper tape 1002. The canopy fastener 818 may be adapted to mate with the interconnecting member fastener 816. For example, as depicted, the interconnecting member fastener 816 includes an interconnecting member zipper half 1014, which mates with the canopy zipper half 1012.

In some implementations, a special zipper may be used for the canopy zipper half 1012 and/or the interconnecting member zipper half 1014. Many zippers are built such that one zipper half must always mate with a unique second zipper half. In such zippers each zipper half may have a different number of zipper teeth for a given length of zipper tape, which may be true even of zipper halves that are designed to mate. For example, two zipper halves may only match up with each other, but not with other zipper halves with the same size teeth. Because each zipper half doesn't not have the same or similar number of teeth for the same or similar length of zipper tape, as unrelated zipper halves are mated, the overall length of each zipper half does not match. This problem is particularly pronounced on a long zipper, such as may be included on the interconnecting member 806. Accordingly, a special zipper may be used so that the zipper halves, as described herein, may be interchangeable. For example, each of the canopy zipper half 1012 and the interconnecting member zipper half 1014 may be manufactured such that they are each interchangeable with other zipper halves of similar tooth size without significantly altering the overall zipper length when the two unrelated halves are joined together. One example of zipper halves that may be used to allow interchangeability may be the Musi™ zipper made by the YKK® company, however, it should be noted that other manufacturers may also make suitable zipper halves that allow interchangeability.

It should be noted that, although the canopy fastener 818 and the interconnecting member fastener 816 are described as including a zipper/zipper halves, the fasteners may include other suitable fasteners, such as Velcro, magnets (e.g., a string of magnetic snaps, a magnetic strip, etc.), a series of snaps, a series of buttons, or any other suitable quick release mechanism.

The interconnecting member 806 illustrated in FIG. 10 may include an interconnecting member fastener 816, an interconnecting member body 1006, and an attachment member 1008. The interconnecting member body 1006 may have a rectangular shape defining a first longitudinal edge 1108 and a second longitudinal edge 1112. The attachment member 1008 may be attached to the interconnecting member body 1006 along the first longitudinal edge 1108 and the interconnecting member fastener 816 may be attached to the interconnecting member body 1006 along the second longitudinal edge 1112.

The interconnecting member body 1006 may be constructed of the same or similar material as the flexible membrane of the canopy 804 or the interconnecting member body 1006 may be constructed of a different material that is strong enough to bind the attachment member 1008 to the interconnecting member fastener 816 (as well as resist any tension placed on the interconnecting member 806 from by the canopy 804 or base member 808). For example, the interconnecting member body 1006 may be constructed of fabric, canvas, mesh, vinyl, nylon, polyester, etc. In some instances, the interconnecting member body 1006 may be reinforced with additional layers of material and/or may be treated for weather resistance.

The interconnecting member body 1006 may have various sizes depending on the implementation. For example, the width of the interconnecting member body 1006 (e.g., the distance between the first longitudinal edge 1108 and the second longitudinal edge 1112) may be 1-4 inches, although other implementations are possible.

In some implementations, the length of the interconnecting member body 1006 may correspond to the distance along three or four sides of the perimeter edge 906 of one or more of the rigid surfaces 904, depending on the implementation. For example, in some implementations, as described in reference to FIG. 12, the length of an interconnecting member body 1006 may correspond to the distance along three sides of the perimeter edge 906 of a single rigid surface 904. In some implementations, the length of the interconnecting member body 1006 may correspond to the distance around 4 sides of the base system 902, for example, the interconnecting member body 1006 may be configured to extend around 6 sides of the perimeter edges 906*a* and 906*b* of base members 808*a* and 808*b*. Further, in some instances, the interconnecting member body 1006 may include additional length or an elastic section to enable the interconnecting member 806 to remain attached to the attachment member receptacles 914 of the base system 902 when the base system 902 is in a closed position (e.g., as depicted in FIG. 9B).

Figure 12:
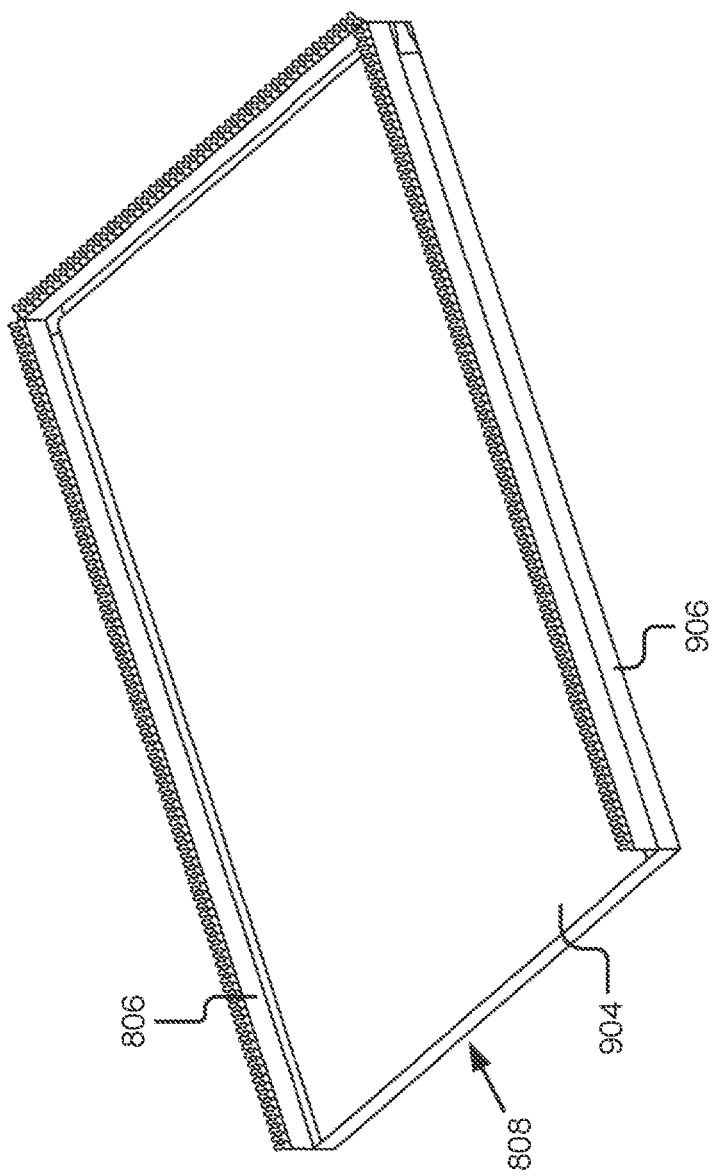
FIG. 12 is a perspective view of an example implementation of an interconnecting member attached to an example implementation of a base member, according to the present disclosure.
Figure 14:
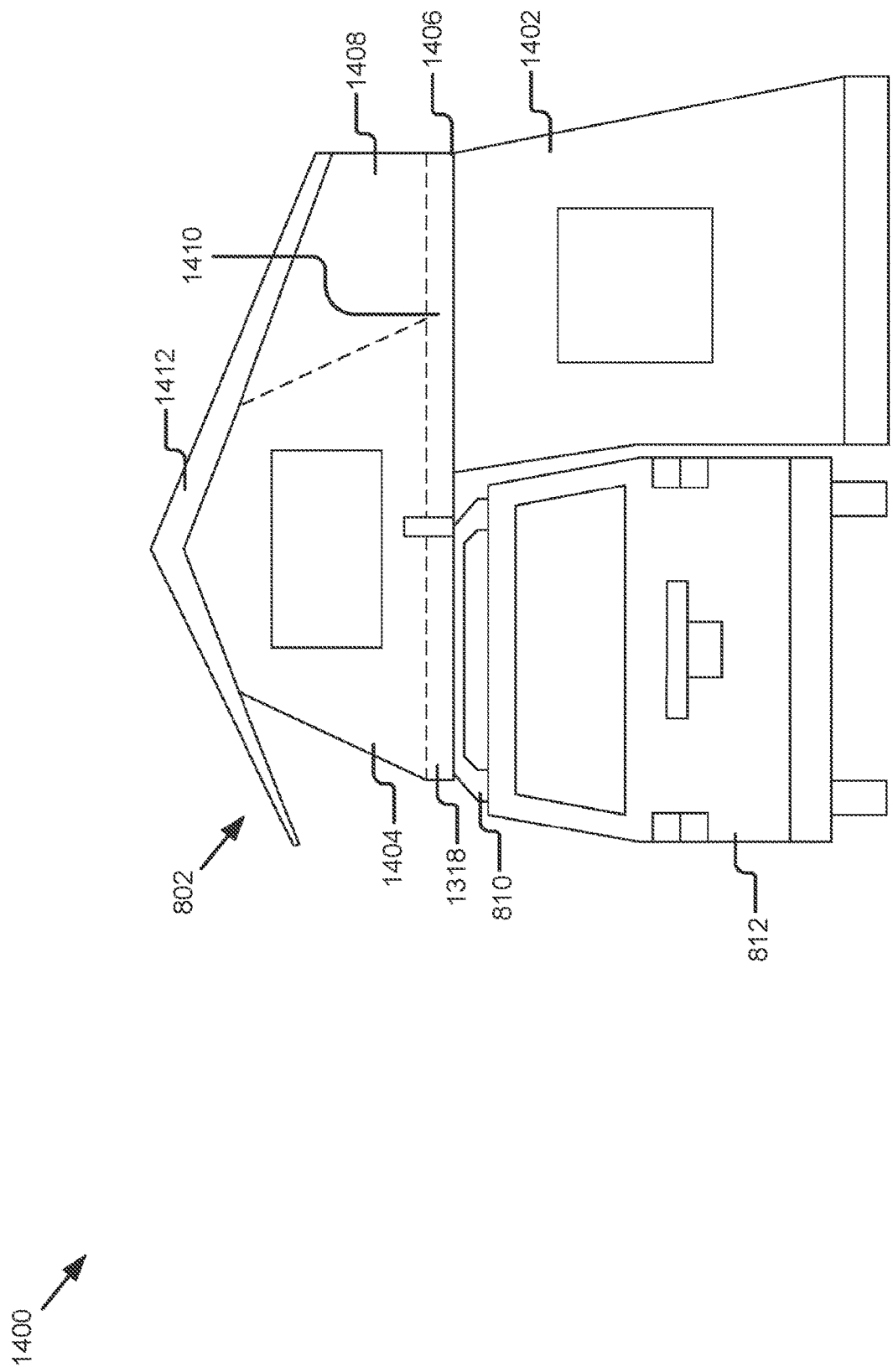
FIG. 14 is a side view of an example implementation of a tent system with an annex mounted to a vehicle, according to the present disclosure.

In some implementations, the tent system 802 may include multiple interconnecting members 806 each having a different length. For example, the tent system 802 may include two interconnecting members 806, each of which is configured as shown in the example of FIG. 12. In some instances, the tent system 802 may also include two or more additional interconnecting members 806 for attaching an additional canopy 804, portion of a canopy 804, cover, or annex 1402 (e.g., as shown in FIG. 14). It should be noted that other lengths and widths are possible without departing from the scope of the techniques described herein.

The attachment member 1008 is configured to attach or otherwise connect with the base system 902, for example, the attachment member 1008 may be attached to the interconnecting member body 1006 along a first longitudinal edge 1108. In some implementations, the attachment member 1008 may be configured for insertion or other interaction with the attachment member receptacle 914. For example, the attachment member 1008 may be sized for insertion into an attachment member receptacle (e.g., a channel defined by the base member 808), so that when the attachment member 1008 is inserted into the attachment member receptacle 914, the attachment member 806 and the base member 808 are fixably attached together. In some instances, the fit of the attachment member 1008 and the attachment member receptacle 914 may be tight enough to form a watertight seal.

In some implementations, the attachment member 1008 may include adhesive, screws, clamped fabric, a bolt cord 1104, or other means of attaching the interconnecting member body 1006 to the base member 808. In some implementations, the attachment member 1008 may include a bolt cord 1104 or welt cord. For example, the attachment member 1008 may include a cord sewn into or otherwise connected to a longitudinal edge 1108 of the interconnecting member body 1006. Suitable materials for the cord may include a rope, a plastic or rubberized strand, cloth piping, roll of fabric, etc.

The interconnecting member fastener 816 may be any fastener configured to attach the interconnecting member body 1006 to the canopy 804 (e.g., to the canopy fastener 818). The interconnecting member fastener 816 may be configured to mate with any one of a plurality of different canopy fasteners 818, so that when the interconnecting member fastener 816 and canopy fastener 818 are mated, the interconnecting member 806 and canopy 804 are detachably, but securely, connected. The interconnecting member fastener 816 may be attached to the interconnecting member body 1006 along the second longitudinal edge 1112 of the interconnecting member body 1006.

In the implementation depicted in FIG. 10, the interconnecting member fastener 816 may include an interconnecting member zipper half 1014. The interconnecting member zipper half 1014 may have a zipper tape 1016 and a series of zipper teeth 1018 extending along and fixably attached to the zipper tape 1016. The interconnecting member zipper half 1014 may be configured to attach to any one of a plurality of different canopy zipper halves 1012. Accordingly, one or more different canopies 804 may interchangeably connect to the interconnecting member 806. For example, the interconnecting member zipper half 1014 may be of the special zipper types described above in reference to the canopy zipper half 1012.

FIG. 11A is a perspective view 1100 of an example implementation of an interconnecting member 806, according to the present disclosure. As described above, the interconnecting member 806 may be a gimp 1102, which includes a bolt cord 1104. The bolt cord 1104 may include a cord longitudinally attached to the gimp body 1106 along a first longitudinal edge 1108. The bolt cord 1104 may be adapted for insertion into an attachment member receptacle 914 of the base system 902. For example, the bolt cord 1104 may interact with a base member 808 by sliding into the attachment member receptacle 914. In some implementations, because the bolt cord 1104 may be difficult to slide into and/or out of the attachment member receptacle 914 on a base member 808, the bolt cord 1104 may be attached to the base member 808 at the factory and may not be removable by a user. Moreover, although the attachment member 1008 may be another mechanism than a bolt cord 1104, as described above, the attachment member 1008 may generally be a permanent or semi-permanent installation, so that it is difficult to easily or quickly remove from a base member 808, or install and align on the base member 808.

Further, as described above, the gimp 1102 may include an interconnecting member fastener 816, such as a gimp zipper half 1110 longitudinally attached to the gimp body 1106 along the second longitudinal edge 1112. An interconnecting member zipper half 1014, such as the gimp zipper half 1110 allows the canopy 804 to be quickly attached or removed from the base member 808. Further the gimp zipper half 1110 automatically aligns and securely attaches the canopy 804 to the base member 808.

FIG. 11B is a perspective view 1150 of an example implementation of an interconnecting member 1152 (which is an implementation of the interconnecting member 806), according to the present disclosure. The interconnecting member 1152 may include an attachment member 1160 along a first longitudinal edge 1162 of an interconnecting member body 1158. The interconnecting member 1152 may include a first interconnecting member fastener 1154 and a second interconnecting member fastener 1156 each attached to the interconnecting member body 1158 along a second longitudinal edge 1164. Similar to the interconnecting member fastener described elsewhere herein, the second interconnecting member fastener 1156 may include an interconnecting member zipper half 1014 with zipper tape 1016 and series of zipper teeth 1018 fixably attached to the zipper tape 1016.

The second interconnecting member fastener 1156 may be configured to mate with any one of a plurality of different canopy fasteners 818. For example, the second interconnecting member fastener 1156 may mate with a second canopy 804 (e.g., with a second canopy fastener 818, which may include a second flexible membrane defining a second membrane edge 832 and a second canopy fastener 818, as described above). For example, the first interconnecting member fastener 1154 may connect a first canopy 804 (e.g., a mesh or lightweight canopy 804) and the second interconnecting member fastener 1156 may connect a second canopy 804 (e.g., a rainfly, weather resistant, insulating, or other canopy 804).

In some implementations, the second interconnecting member fastener 1156 may connect a cover (not shown) when the tent system 802 is in a closed position. For example, the tent system 802 (e.g., a base system 902, tent poles 910, canopy(ies) 804) may fold or compress when the tent system 802 is a closed position and a cover (e.g., made of canvas, tent material, vinyl, etc.) may cover the closed tent system 802. For example, a cover may attach to an interconnecting member 806, in a similar way as is described in reference to the canopy 804. For example, in some implementations, a canopy 804 may attach to the first interconnecting member fastener 1154 and a cover may connect to the second interconnecting member fastener 1156.

In some implementations, the second interconnecting member fastener 1156 may connect an annex 1402, as shown and described in reference to FIG. 14.

In some implementations, the first interconnecting member fastener 1154 and the second interconnecting member fastener 1156 may be different lengths, so that the first interconnecting fastener 1154 may mate with a first configuration of a canopy 804 and the second interconnecting member 1156 may mate with a cover or a second configuration of a canopy 804 (e.g., a water-resistant or solid canopy 804, etc.). For example, in some implementations, the first interconnecting fastener 1154 may be configured to extend along three sides of a perimeter edge 906 of the rigid surface 904 (e.g., as illustrated in FIG. 12), but the second interconnecting fastener 1156 may be configured to extend along four sides of a perimeter edge 906 the rigid surface 904.

Although FIG. 11B illustrates an interconnecting member 1152 with two interconnecting member fasteners 1154 and 1156, it should be understood that other configurations are possible, for example, an interconnecting member 1152 may include three interconnecting member fasteners 816 (e.g., one interconnecting member fastener 816 for a mesh canopy 804, one interconnecting member fastener 816 for a rain fly, and one interconnecting member fastener 816 for a cover or annex 1402). The use of an interconnecting member 1242 with multiple interconnecting member fasteners 816 may allow the base member 808 to include a single attachment member receptacle 914, while accommodating multiple canopies 804 and/or a cover.

FIG. 12 is a perspective view 1200 of an example implementation of an interconnecting member 806 attached to a base member 808. In the depicted implementation, the interconnecting member 806 is connected along three sides of the perimeter edge 906 of the rigid surface 904. For example, the rigid surface 904 may correspond to one rigid surface 904a or 904b, as illustrated in FIG. 9A.

In some implementations, the tent system 802 may include a second base member 808 (e.g., as in the base system 902 illustrated in FIG. 9A) with a second interconnecting member 806. For example, a first interconnecting member 806 may be attached to a first rigid surface 904a and a second interconnecting member 806 may attach a second rigid surface 904b. In some implementations, one or both of the rigid surfaces 904a and 904b include one or more different implementations of interconnecting members 806, as described herein. For example, the first interconnecting member 806 may have a different length (e.g., along four edges of the rigid surface 904a) than the second interconnecting member 806 (e.g., along three edges of the rigid surface 904b). Similarly, each of the first and second interconnecting members 806 may have different configurations of the number of interconnecting member fasteners 816 (e.g., 1154 and 1156) used. Such different configurations of interconnecting members 806 or 1152 (e.g., as shown in FIG. 13) may allow a canopy 804 to be connected along the perimeter edge formed when two rigid surfaces 904a and 904b are combined, while also allowing a cover to be attached to one rigid surface 904a when the tent system 802 is in a closed position.

Further, it should be noted that although the example of the interconnecting member 806 shown in FIG. 12 is continuous around three edges of the rigid surface 904, in some implementations, multiple interconnecting members 806 may be used, for example, three shorter interconnecting members 806 may replace a U shaped interconnecting member 806 shown in FIG. 12.

Figure 13:
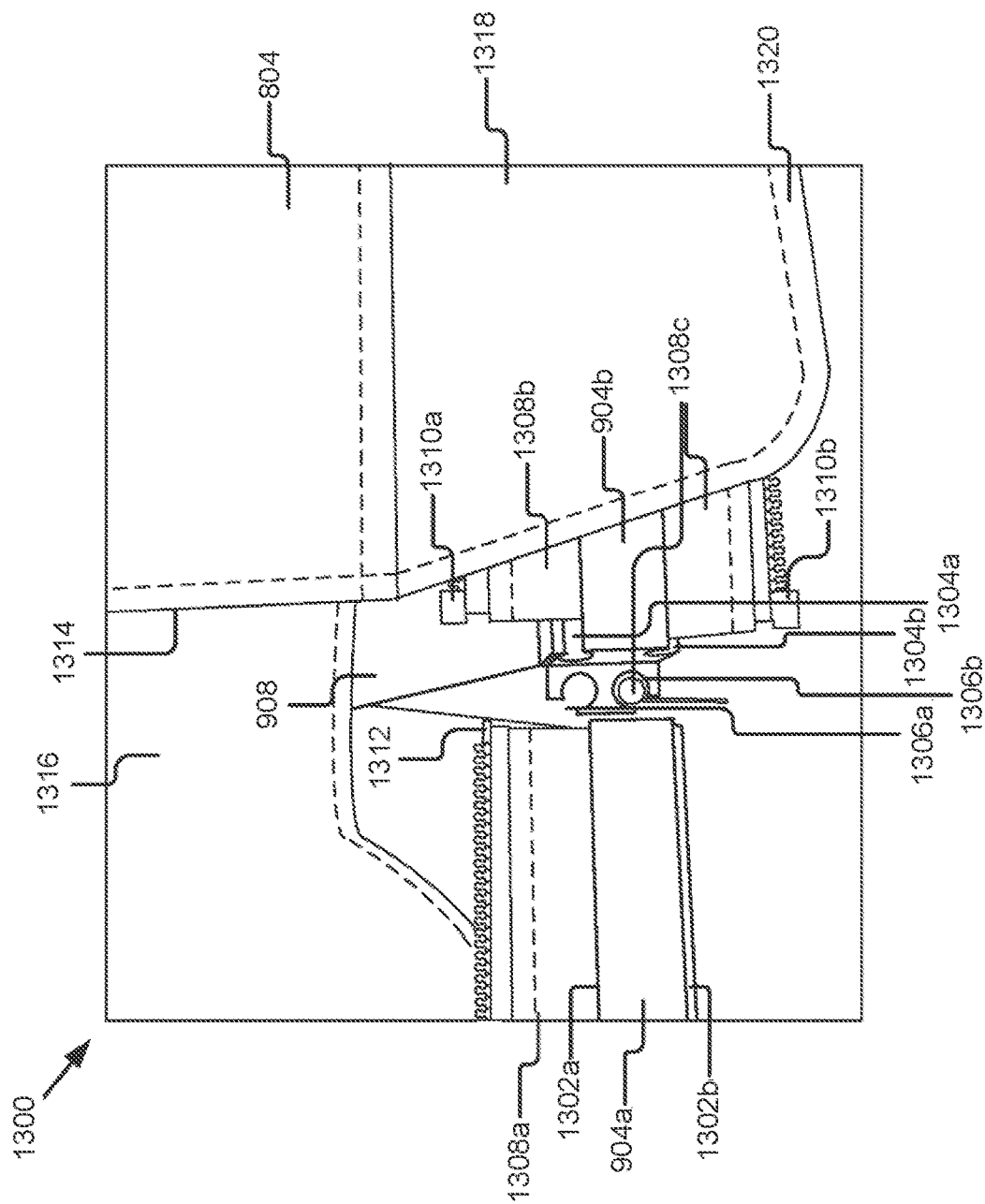
FIG. 13 is a side view of a partial section of an example implementation of a tent system, according to the present disclosure.

FIG. 13 is a side view 1300 of a partial section of an example implementation of a tent system 802, according to the present disclosure. Some components of the tent system 802 are not shown in the side view 1300 in order to expose other components, for clarity and explanation herein. For example, portions of a canopy 804, canopy fasteners 818, zipper sliders, etc., are omitted from the side view 1300 depicted in FIG. 13.

The side view 1300 shows a hinge 908 attached to a first rigid surface 904a and a second rigid surface 904b. As illustrated, the first rigid surface 904a may include two attachment member receptacles 1302a and 1302b and the second rigid surface 904b may include two attachment member receptacles 1304a and 1304b. The rigid surface 904b may also include a third and fourth attachment member receptacle 1306a and 1306b running along a perimeter edge of the second rigid surface 904b between the first and second rigid surfaces 904a and 904b, as shown in the side view 1300.

As illustrated in FIG. 13, the attachment member receptacles 1302a and 1304a each have attached thereto interconnecting members 1308a and 1308b, respectively. In the depicted implementation, the interconnecting members 1308a and 1308b may be used to connect a single canopy 804. For example, a canopy 804 may include two canopy fasteners 818 (not shown in FIG. 13), which are connected along a membrane edge 832 of the canopy 804 and each correspond to an interconnecting member 806, such as is illustrated in FIG. 12. The break between the interconnecting member 1308a and the interconnecting member 1308b (as well as the corresponding canopy fasteners) may allow the tent system 802 to be folded at the hinge 908 to a closed position when not in use, as described elsewhere herein. Accordingly, the canopy fastener 818 and interconnecting member 806 may not extend up the slit 1310 in the side of the canopy 804, according to some implementations of the techniques described herein.

The attachment member receptacles 1304b and 1306b may have attached thereto a single interconnecting member 1308c. For example, the interconnecting member 1308c may extend around all four edges of a rigid surface 904 and be used to attach a cover to the tent system 802 when the tent system 802 is in a closed position.

In the implementation shown in FIG. 13, zipper retainer boxes 1310a and 1310b may be seen attached to the interconnecting members 1308b and 1308c. Similarly, a zipper pin box 1312 may be seen attached to the interconnecting member 1308a.

In some implementations, the canopy 804 may include a slit 1314 (only one side of the slit 1314 is shown in the side view 1300) in the flexible membrane of the canopy 804 where the canopy 804 crosses the hinge 908. The slit 1314 is configured to allow the canopy 804 to fold without being detached from the rigid surfaces 904. It should be noted that, in some implementations, the slit 1314 may alternatively be replaced with an elastic portion of the flexible membrane of canopy 804 to allow the canopy 804 to fold with the base system 902 while attached to the rigid surfaces 904. Additionally, the canopy 804 may include a slit cover 831 (e.g., constructed of the same or similar material as the flexible membrane), as shown in FIG. 8. The slit cover 831 may be configured to protect the slit 1314 from insects, rain, wind, etc., and may be secured to the canopy 804 using Velcro, or a similar attachment mechanism.

In some implementations, the canopy 804 may include an inner membrane 1316 attached to the flexible membrane and configured to provide additional protection for the hinge 908.

In some implementations, the canopy 804 may include a flap 1318 attached to the flexible membrane along the membrane edge 832. The flap may include a substantially rectangular strip of flexible material (e.g., the flap 1318 may constructed of the same or similar material as the flexible membrane). A longitudinal edge of the flap 1318 may be welded, sewn, or otherwise attached to the flexible membrane, for example, along or near (e.g., within five to ten inches of) the membrane edge 832. The flap 1318 may be configured to provide additional protection to the canopy fastener 818, the interconnecting member 806 (or 1308), and the base member 808. For example, the flap 1318 may be adapted to extend from the membrane edge 832 of the flexible membrane of the canopy 804 and overlap the canopy fastener 818, the interconnecting member fastener 816, the interconnecting member body 1006, and the perimeter edge 906 of the base member 808 to provide weather (e.g., rain) protection for each of these components. In some implementations, to provide additional protection for the interconnecting member 806, the flap 1318 may include a draw string or elastic (not shown) along its edge 1320, which may enable the flap 1318 to provide additional weather protection to the interconnecting member 806 by securing the flap 1318 under the rigid surface 904.

FIG. 14 is a side view 1400 of an example implementation of a tent system 802 with annex 1402 mounted to a vehicle 812, according to the present disclosure. In the depicted implementation, the tent system 802 includes an expanded canopy 1404 with a suspended fly 1412 on a base member 808 (the base member is not visible in the side view 1400, because it is covered by a flap 1318). The base member 808 may be mounted to a roof rack 810 of a vehicle 812, as described in reference to FIG. 8.

In some implementations, the base member 808 is smaller than the expanded canopy 1404, so the expanded canopy 1404 interacts with, or includes, a frame (not shown) that supports the additional canopy portion 1408 and the interconnecting member 806 connects to an inner door portion of the expanded canopy 1404 (e.g., an inner door portion may connect at an edge 1410 of the base member 808 such that the expanded canopy 1404 includes an inner door portion and an expanded portion covering the annex 1402). In some implementations, the base member 808 may include an attachable or telescoping bar (not shown) on one side for extending an edge 1406 (e.g., a perimeter edge) of the base member 808 to accommodate for an expanded canopy 1404 and/or annex 1402. Accordingly, an interconnecting member 806 (also not visible in the side view 1400) may be attached to the attachable or telescoping bar.

In some implementations, the tent system 802 may include a second interconnecting member 806, or an interconnecting member 1152 with multiple interconnecting member fasteners, which allows the base member 808 to connect to an annex 1402. The annex 1402 may include a flexible annex membrane which defines an annex edge (the annex edge is not shown because in the depicted limitation it is covered by the flap 1318). In some implementations, the annex 1402 may be constructed of the same or similar material as the canopy 804. The annex edge may include an annex fastener, whose construction and functionality may correspond to the construction and functionality of the canopy fastener 818 described above. The annex fastener may connect to the interconnecting member fastener 816 in the same or similar way as the canopy fastener 818.

The annex 1402 may be positioned below a base member 808. In some implementations, the annex 1402 may be positioned both below the base member 808 and extending out to the side of the base member 808 and may conceal the support 814. Further, in some implementations, the height of the annex 1402 may be expandable (e.g., a floor of the annex 1402 may be adjustable) to accommodate different heights of vehicles 812.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above described implementations, implementations, and examples, but by all implementations, implementations, and examples, and other equivalents within the scope and spirit of the invention as claimed.

What is claimed is:

1. A tent system, comprising:
    a first shell member configured to mount to a vehicle;
    a second shell member coupled to the first shell member, wherein the second shell member is configured to close into a parallel plane over the first shell member when in a collapsed position;
    a canopy comprising:
        a flexible membrane having a membrane edge,
        a canopy fastener coupled to at least a portion of the membrane edge and configured to mate with a shell fastener, and
        a flap configured to overlap the canopy fastener to provide weather protection;
    a shell interconnector configured to couple at least a portion of the first shell member, the second shell member, or both to the canopy, the shell interconnector comprising:
        a shell membrane having a shell membrane edge, and
        the shell fastener, wherein the shell fastener is coupled to at least a portion of the shell membrane edge and configured to mate with the canopy fastener; and
    a lift mechanism coupling the second shell member to the first shell member, the lift mechanism configured to extend the second shell member vertically over the first shell member in a deployed position,
    wherein the lift mechanism comprises a multi-bar linkage.

2. The tent system of claim 1, wherein, in the deployed position, the second shell member is disposed in a non-parallel plane over the first shell member.

3. A tent system, comprising:
    a first shell member configured to mount to a vehicle;
    a second shell member coupled to the first shell member, wherein the second shell member is configured to close into a parallel plane over the first shell member when in a collapsed position;
    a canopy comprising:
        a flexible membrane having a membrane edge,
        a canopy fastener coupled to at least a portion of the membrane edge and configured to mate with a shell fastener, and
        a flap configured to overlap the canopy fastener to provide weather protection;
    a shell interconnector configured to couple at least a portion of the first shell member, the second shell member, or both to the canopy, the shell interconnector comprising:
        a shell membrane having a shell membrane edge, and
        the shell fastener, wherein the shell fastener is coupled to at least a portion of the shell membrane edge and configured to mate with the canopy fastener; and
    a lift mechanism coupling the second shell member to the first shell member, the lift mechanism configured to extend the second shell member vertically over the first shell member in a deployed position,
    wherein, in the deployed position, the second shell member is disposed in a parallel plane over the first shell member.

* * * * *

UNITED STATES PATENT AND TRADEMARK OFFICE
CERTIFICATE OF CORRECTION

| | |
|---|---|
| PATENT NO. | : 11,608,654 B2 |
| APPLICATION NO. | : 17/824068 |
| DATED | : March 21, 2023 |
| INVENTOR(S) | : Currid |

It is certified that error appears in the above-identified patent and that said Letters Patent is hereby corrected as shown below:

On the Title Page

Item [73], delete "HIllerstorp" and insert --Hillerstorp--, therefor.

Signed and Sealed this
Second Day of May, 2023

Katherine Kelly Vidal
*Director of the United States Patent and Trademark Office*